(12) United States Patent
Yamaguchi et al.

(10) Patent No.: US 9,605,143 B2
(45) Date of Patent: Mar. 28, 2017

(54) RESIN COMPOSITION FOR FORMATION OF OPTICAL WAVEGUIDE, RESIN FILM FOR FORMATION OF OPTICAL WAVEGUIDE WHICH COMPRISES THE RESIN COMPOSITION, AND OPTICAL WAVEGUIDE PRODUCED USING THE RESIN COMPOSITION OR THE RESIN FILM

(75) Inventors: Masatoshi Yamaguchi, Ibaraki (JP); Tatsuya Makino, Ibaraki (JP); Masami Ochiai, Ibaraki (JP)

(73) Assignee: HITACHI CHEMICALS COMPANY, LTD., Tokyo (JP)

( * ) Notice: Subject to any disclaimer, the term of this patent is extended or adjusted under 35 U.S.C. 154(b) by 171 days.

(21) Appl. No.: 13/818,136

(22) PCT Filed: Aug. 22, 2011

(86) PCT No.: PCT/JP2011/068896
§ 371 (c)(1),
(2), (4) Date: May 20, 2013

(87) PCT Pub. No.: WO2012/026435
PCT Pub. Date: Mar. 1, 2012

(65) Prior Publication Data
US 2013/0223803 A1 Aug. 29, 2013

(30) Foreign Application Priority Data

Aug. 24, 2010 (JP) ................. 2010-187502

(51) Int. Cl.
*G02B 6/138* (2006.01)
*C08L 33/10* (2006.01)
(Continued)

(52) U.S. Cl.
CPC .......... *C08L 33/10* (2013.01); *C08G 18/0823* (2013.01); *C08G 18/792* (2013.01);
(Continued)

(58) Field of Classification Search
CPC .............. C08G 18/0823; C08G 18/792; C08G 18/8077; C08L 33/10; C09D 175/16;
(Continued)

(56) References Cited

U.S. PATENT DOCUMENTS 6,653,394 B1  11/2003  Meisenburg et al.
8,538,230 B2 *  9/2013  Ochiai et al. ................. 385/145
(Continued)

FOREIGN PATENT DOCUMENTS

JP  07-278254  * 10/1995
JP  7-278254  10/1995
(Continued)

*Primary Examiner* — Martin Angebranndt
(74) *Attorney, Agent, or Firm* — Fitch, Even, Tabin & Flannery LLP

(57) ABSTRACT

The present invention relates to: a resin composition for forming an optical waveguide, containing (A) a polymer having a hydroxyl group and/or a carboxyl group, (B) a (meth)acrylate having a urethane bond, (C) a polyfunctional blocked isocyanate compound, and (D) a radical polymerization initiator; a resin film for forming an optical waveguide, containing the resin composition for forming an optical waveguide; and an optical waveguide containing a lower cladding layer, a core part and an upper cladding layer, at least one of which contains the resin composition for forming an optical waveguide or the resin film for forming an optical waveguide. The present invention provides a resin composition for forming an optical waveguide that can form a high precision thick film excellent in transparency, heat resistance and toughness and is useful for a resin film for forming an optical waveguide having high productivity; a resin film for an optical material containing the resin composition for forming an optical waveguide; and a resin composition for forming an optical waveguide, a resin film for forming an optical waveguide, and an optical waveguide
(Continued)

excellent in transparency, heat resistance, environmental reliability and toughness, using the same.

11 Claims, 1 Drawing Sheet

(51) Int. Cl.
  *C08G 18/80* (2006.01)
  *G02B 6/122* (2006.01)
  *C08G 18/79* (2006.01)
  *C08G 18/08* (2006.01)
  *C09D 175/16* (2006.01)
  *G02B 6/02* (2006.01)

(52) U.S. Cl.
  CPC ....... *C08G 18/8077* (2013.01); *C09D 175/16* (2013.01); *G02B 6/02* (2013.01); *G02B 6/1221* (2013.01); *G02B 6/138* (2013.01)

(58) Field of Classification Search
  CPC .... G02B 6/02; G02B 6/1221; G02B 6/12069; G02B 6/12171; G02B 6/138
  See application file for complete search history.

(56) References Cited

U.S. PATENT DOCUMENTS

| | | | | |
|---|---|---|---|---|
| 2005/0267230 A1* | 12/2005 | Esaki | ............... | C08F 290/06 522/172 |
| 2007/0081782 A1* | 4/2007 | Maeda et al. | ................. | 385/145 |
| 2009/0196559 A1* | 8/2009 | Makino et al. | ................ | 385/126 |
| 2010/0041785 A1* | 2/2010 | Ohashi et al. | .................. | 522/78 |
| 2011/0188827 A1* | 8/2011 | Yamaguchi et al. | ........... | 385/129 |
| 2013/0287354 A1* | 10/2013 | Sakai | .................... | G02B 6/1228 385/126 |
| 2014/0321807 A1* | 10/2014 | Sakai | ..................... | G02B 6/122 385/14 |
| 2015/0016773 A1* | 1/2015 | Sakai | ................... | G02B 6/122 385/14 |
| 2015/0139589 A1* | 5/2015 | Sakai | ................... | G02B 6/3807 385/76 |
| 2015/0234125 A1* | 8/2015 | Sakai | ...................... | G02B 6/32 385/14 |

FOREIGN PATENT DOCUMENTS

| | | | |
|---|---|---|---|
| JP | 8-15861 | | 1/1996 |
| JP | 2002-531607 | | 9/2002 |
| JP | 2006-71880 | | 3/2006 |
| JP | 2006-146162 | | 6/2006 |
| JP | 2007-010794 | * | 1/2007 |
| JP | 2007-122023 | | 5/2007 |
| JP | 2008-33239 | | 2/2008 |
| JP | 2009-134000 | | 6/2009 |
| JP | 2010-020328 | * | 1/2010 |
| JP | 2010-126633 | | 6/2010 |
| JP | 2011-117988 | * | 6/2011 |
| WO | WO 2004/079452 A1 | | 9/2004 |
| WO | WO 2005/081025 A1 | | 9/2005 |
| WO | 2007043240 | * | 4/2007 |
| WO | 2009/078341 | * | 6/2009 |
| WO | WO 2009/093679 A1 | | 7/2009 |

* cited by examiner

RESIN COMPOSITION FOR FORMATION OF OPTICAL WAVEGUIDE, RESIN FILM FOR FORMATION OF OPTICAL WAVEGUIDE WHICH COMPRISES THE RESIN COMPOSITION, AND OPTICAL WAVEGUIDE PRODUCED USING THE RESIN COMPOSITION OR THE RESIN FILM

TECHNICAL FIELD

The present invention relates to a resin composition for forming an optical waveguide, a resin film for forming an optical waveguide, and an optical waveguide using them, and particularly relates to a resin composition for forming an optical waveguide that is excellent in transparency, heat resistance and toughness, a resin film for forming an optical waveguide using the resin composition for forming an optical waveguide, and an optical waveguide that is excellent in transparency, heat resistance, environmental reliability and toughness using them.

BACKGROUND ART

High speed and high density signal transfer between electronic devices or between circuit boards with an ordinary electric circuit is now encountering a limitation in increase of the speed and density due to mutual interference and attenuation of the signals as barriers. For breaking the limitation, a technique of connecting electronic devices or circuit boards with light, i.e., a so-called an optical interconnection technology, is being developed. As an optical transmission line, a polymer optical waveguide is receiving attention due to the easiness of processing, the low cost, the high degree of freedom on wiring, and the capability of high densification thereof.

Preferred examples of embodiments of the polymer optical waveguide include a rigid optical waveguide, which is formed of a hard supporting substrate, such as a glass epoxy resin substrate, and is assumed to be applied to an optoelectronic composite circuit board, and a flexible optical waveguide, which has no rigid supporting substrate and is assumed to be used for connecting boards to each other.

Furthermore, a flexible circuit board and an optical waveguide are integrated to form an optoelectronic composite flexible circuit board, which is further enhanced in degree of freedom on implementation.

A polymer optical waveguide is demanded to have heat resistance and environmental reliability from the standpoint of the use environment of an equipment, to which the optical waveguide is applied, and the component implementation, in addition to transparency (i.e., a low optical transmission loss). There is also an increasing demand for toughness from the standpoint of the strength and the handleability of the optical waveguide. The production process of an optical waveguide is demanded to enable simple formation of a core pattern, and one example of a method therefor is a pattern forming method by exposure and development, which has been widely employed in the production process of a printed circuit board. As a material for the process, an optical waveguide material containing a (meth)acrylic polymer has been known (see, for example, Patent Documents 1 to 4).

However, the optical waveguide materials described in Patent Documents 1 and 2 can form a core pattern by exposure and development, have transparency at a wavelength of 850 nm, and have a good optical transmission loss after subjecting to a high temperature and high humidity shelf test, but there is no specific description about specific test results on evaluation of heat resistance, such as an optical transmission loss after subjecting to a solder reflow test, which is unclear.

The optical waveguide material described in Patent Document 3 exhibits excellent optical transmission loss and has good heat resistance, but is brittle and thus is insufficient in toughness.

The optical waveguide material described in Patent Document 4 has transparency at a wavelength of 850 nm and is excellent in toughness, but there is no specific description about specific test results on evaluation of heat resistance, such as an optical transmission loss after subjecting to a solder reflow test, or the like, which is unclear. Similarly, there is no specific description about specific test results on evaluation of environmental reliability, such as an optical transmission loss after subjecting to a high temperature and high humidity shelf test or after subjecting to a temperature cycle test, which is unclear.

PRIOR ART DOCUMENTS

Patent Documents

Patent Document 1
JP-A-2006-146162
Patent Document 2
JP-A-2008-33239
Patent Document 3
JP-A-2006-71880
Patent Document 4
JP-A-2007-122023

SUMMARY OF THE INVENTION

Problems to be Solved by the Invention

In view of the problems described above, an object of the present invention is to provide a resin composition for forming an optical waveguide and a resin film for forming an optical waveguide that form an optical waveguide excellent in transparency, heat resistance, environmental reliability and toughness, with good productivity and workability, and an optical waveguide using them.

Means for Solving the Problems

As a result of earnest investigations made by the present inventors, it has been found that the problems may be solved by the use of a resin composition for forming an optical waveguide containing a polymer having a hydroxyl group and/or a carboxyl group, a (meth)acrylate having a urethane bond, a polyfunctional blocked isocyanate compound, and a radical polymerization initiator, thereby reacting a hydroxyl group and/or a carboxyl group of the polymer with an isocyanate group formed from the polyfunctional blocked isocyanate compound, and thus the present invention has been completed.

The present invention provides: a resin composition for forming an optical waveguide, containing (A) a polymer having a hydroxyl group and/or a carboxyl group, (B) a (meth)acrylate having a urethane bond, (C) a polyfunctional blocked isocyanate compound, and (D) a radical polymerization initiator; a resin film for forming an optical waveguide, containing the resin composition for forming an optical waveguide; and an optical waveguide excellent in transparency, heat resistance, environmental reliability and toughness, containing a lower cladding layer, a core part and an upper cladding layer, at least one of which contains the resin composition for forming an optical waveguide or the resin film for forming an optical waveguide.

Advantages of the Invention

According to the present invention, such a resin composition for forming an optical waveguide is provided that can form a high precision thick film excellent in transparency, heat resistance and toughness, is effective for producing an optical waveguide, and is useful for a resin film for forming an optical waveguide having high productivity on producing an optical waveguide. Furthermore, a resin film for forming an optical waveguide containing the resin composition for forming an optical waveguide, and an optical waveguide excellent in transparency, heat resistance, environmental reliability and toughness are also provided.

EMBODIMENTS FOR CARRYING OUT THE INVENTION

Resin Composition for Forming Optical Waveguide

Figure 1:
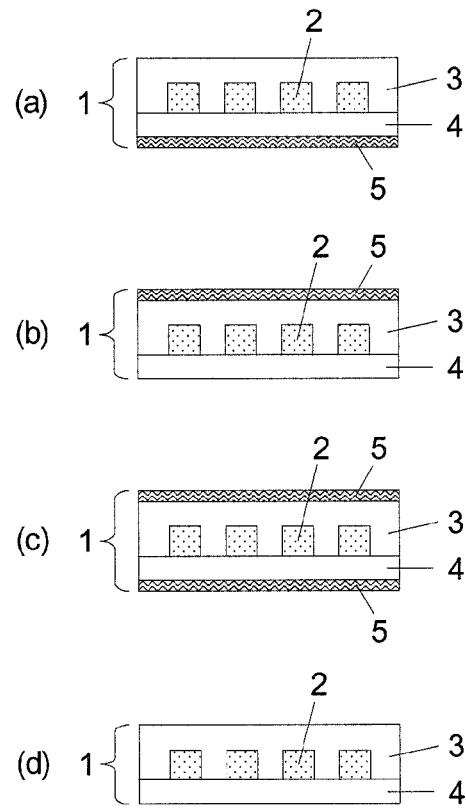
FIG. 1 is a cross sectional view showing embodiments of an optical waveguide according to the present invention.

The resin composition for forming an optical waveguide of the present invention will be described below.

The resin composition for forming an optical waveguide of the present invention contains (A) a polymer having a hydroxyl group and/or a carboxyl group, (B) a (meth) acrylate having a urethane bond, (C) a polyfunctional blocked isocyanate compound, and (D) a radical polymerization initiator.

The components (A) to (D) will be described below.
(A) Polymer Having Hydroxyl Group and/or Carboxyl Group In the present invention, the polymer having a hydroxyl group and/or a carboxyl group (A) is used. The use of the polymer having a hydroxyl group and/or a carboxyl group newly forms a crosslinked structure by heating and reacting a hydroxyl group and/or a carboxyl group with an isocyanate group formed from the polyfunctional blocked isocyanate compound as the component (C), thereby enhancing the heat resistance and the environmental reliability.

The polymer having a hydroxyl group and/or a carboxyl group (A) is not particularly limited, and examples thereof include the polymers shown by the items (1) to (13) below.

(1) A polymer obtained by copolymerizing at least one of a compound having a hydroxyl group and an ethylenic unsaturated group in the molecule thereof and a compound having a carboxyl group and an ethylenic unsaturated group in the molecule thereof, and another compound having an ethylenic unsaturated group.

(2) A polymer obtained by introducing partly an ethylenic unsaturated group to a side chain of a polymer obtained by copolymerizing at least one of a compound having a hydroxyl group and an ethylenic unsaturated group in the molecule thereof and a compound having a carboxyl group and an ethylenic unsaturated group in the molecule thereof, and another compound having an ethylenic unsaturated group.

(3) A polymer obtained by reacting a polymer obtained by copolymerizing a compound having an epoxy group and an ethylenic unsaturated group in the molecule thereof and another compound having an ethylenic unsaturated group, with a compound having a carboxyl group and an ethylenic unsaturated group in the molecule thereof.

(4) A polymer obtained by reacting a polymer obtained by copolymerizing a compound having an epoxy group and an ethylenic unsaturated group in the molecule thereof and another compound having an ethylenic unsaturated group, with a compound having a carboxyl group and an ethylenic unsaturated group in the molecule thereof, and reacting the thus formed hydroxyl group with a polybasic acid anhydride.

(5) A polymer obtained by reacting a polymer obtained by copolymerizing an acid anhydride having an ethylenic unsaturated group and another compound having an ethylenic unsaturated group, with a compound having a hydroxyl group and an ethylenic unsaturated group in the molecule thereof.

(6) A polymer obtained by copolymerizing a bifunctional epoxy resin and a bifunctional phenol compound.

(7) A polymer obtained by reacting a hydroxyl group of a polymer obtained by copolymerizing a bifunctional epoxy resin and a bifunctional phenol compound, with a polybasic acid anhydride.

(8) A polymer obtained by copolymerizing a bifunctional epoxy resin and a bifunctional carboxylic acid compound.

(9) A polymer obtained by reacting a hydroxyl group of a polymer obtained by copolymerizing a bifunctional epoxy resin and a bifunctional carboxylic acid compound, with a polybasic acid anhydride.

(10) A polymer obtained by copolymerizing a bifunctional oxetane compound and a bifunctional phenol compound.

(11) A polymer obtained by reacting a hydroxyl group of a polymer obtained by copolymerizing a bifunctional oxetane compound and a bifunctional phenol compound, with a polybasic acid anhydride.

(12) A polymer obtained by copolymerizing a bifunctional oxetane compound and a bifunctional carboxylic acid compound.

(13) A polymer obtained by reacting a hydroxyl group of a polymer obtained by copolymerizing a bifunctional oxetane compound and a bifunctional carboxylic acid compound, with a polybasic acid anhydride.

Among these, the polymers having a hydroxyl group and/or a carboxyl group shown in the items (1) to (5) are preferred, and a (meth)acrylic polymer that has at least one of structural units represented by the following general formulae (1) and (2) and has a structural unit represented by the following general formula (3) is more preferred from the standpoint of the transparency.

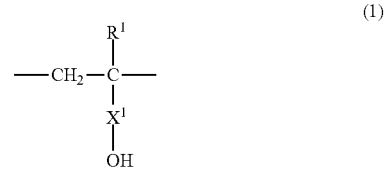
(1)

In the formula, $R^1$ represents a hydrogen atom or a methyl group, and $X^1$ represents a single bond or a divalent organic group having from 1 to 20 carbon atoms. The divalent organic group having from 1 to 20 carbon atoms represented by $X^1$ is not particularly limited, and examples thereof include a divalent organic group containing an alkylene group, a cycloalkylene group, a phenylene group, a biphenylene group, a polyether group, a polysiloxane group, a carbonyl group, an ester group, an amide group, a urethane group and the like, and these groups may be further substituted by a halogen atom, an alkyl group, a cycloalkyl group, an aryl group, an aralkyl group, a carbonyl group, a formyl group, an ester group, an amide group, an alkoxy group, an aryloxy group, an alkylthio group, an arylthio group, a silyl group, a silyloxy group and the like.

Among these, an alkylene group, a cycloalkylene group, a phenylene group and a biphenylene group are preferred from the standpoint of the transparency and the heat resistance.

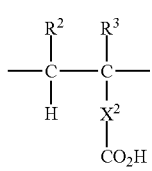

(2)

In the formula, $R^2$ represents a hydrogen atom or a monovalent organic group having from 1 to 20 carbon atoms, and $R^3$ represents a hydrogen atom or a methyl group. The monovalent organic group having from 1 to 20 carbon atoms represented by $R^2$ is not particularly limited, and examples thereof include a monovalent organic group, such as an alkyl group, a cycloalkyl group, an aryl group, an aralkyl group, a carbonyl group (which means —CO—R, wherein R represents a hydrocarbon group), an ester group (which means —CO—O—R or —O—CO—R, wherein R represents a hydrocarbon group) and an amide group (which means —CO—NR$_2$ or —NR—CO—R, wherein R represents a hydrogen atom or a hydrocarbon group), and these groups may be further substituted by a hydroxy group, a halogen atom, an alkyl group, a cycloalkyl group, an aryl group, an aralkyl group, a carbonyl group, a formyl group, an ester group, an amide group, an alkoxy group, an aryloxy group, an alkylthio group, an arylthio group, an amino group, a silyl group, a silyloxy group and the like.

Among these, an alkyl group, a cycloalkyl group, an aryl group and an aralkyl groups are preferred from the standpoint of the transparency and the heat resistance.

In the formula, $X^2$ represents a single bond or a divalent organic group having from 1 to 20 carbon atoms. Preferred examples of the divalent organic group having from 1 to 20 carbon atoms include those groups that are described for the specific examples of $X^1$.

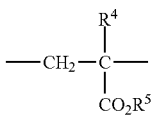

(3)

In the formula, $R^4$ represents a hydrogen atom or a methyl group, and $R^5$ represents a monovalent organic group having from 1 to 20 carbon atoms. Preferred examples of the monovalent organic group having from 1 to 20 carbon atoms include those groups that are described for the specific examples of $R^2$.

The (meth)acrylic polymer herein means a polymer that is obtained by copolymerizing a monomer having a (meth) acryloyl group, such as an acrylic acid, an acrylate ester, a methacrylic acid, a methacrylate ester, and derivatives thereof. The (meth)acryloyl group herein means an acryloyl group and/or a methacryloyl group. The (meth)acrylic polymer may be a copolymer that contains the above-described monomer and a monomer other than the above-described monomer having an ethylenic unsaturated group other than the (meth)acryloyl group in such a range that does not impair the advantages of the present invention. The (meth)acrylic polymer may be a mixture of plural (meth)acrylic polymers.

A compound that is a raw material of the structural unit represented by the general formula (1) in the (meth)acrylic polymer is not particularly limited, and examples thereof include an aliphatic (meth)acrylate, such as 2-hydroxyethyl (meth)acrylate, 2-hydroxypropyl(meth)acrylate, 3-chloro-2-hydroxypropyl(meth)acrylate and 2-hydroxybutyl(meth) acrylate; and an aromatic (meth)acrylate, such as 2-hydroxy-3-phenoxypropyl(meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate.

Among these, an aliphatic (meth)acrylate, such as 2-hydroxyethyl(meth)acrylate, 2-hydroxypropyl(meth)acrylate and 2-hydroxybutyl(meth)acrylate; and an aromatic (meth) acrylate, such as 2-hydroxy-3-phenoxypropyl(meth)acrylate and 2-hydroxy-3-(o-phenylphenoxy)propyl(meth)acrylate, are preferred from the standpoint of the transparency and the heat resistance.

These compounds may be used solely or as a combination of two or more kinds thereof.

A compound that is a raw material of the structural unit represented by the general formula (2) in the (meth)acrylic polymer is not particularly limited, and examples thereof include (meth)acrylic acid, crotonic acid, cinnamic acid, maleic acid, fumaric acid, citraconic acid, mesaconic acid, itaconic acid, mono(2-(meth)acryloyloxyethyl)succinate, mono(2-(meth)acryloyloxyethyl)phthalate, mono(2-(meth) acryloyloxyethyl)isophthalate, mono(2-(meth)acryloyloxy-ethyl)terephthalate, mono(2-(meth)acryloyloxyethyl)tetrahydrophthalate, mono(2-(meth)acryloyloxyethyl) hexahydrophthalate, mono(2-(meth)acryloyloxyethyl) hexahydroisophthalate, mono(2-(meth)acryloyloxyethyl) hexahydroterephthalate, w-carboxy-polycaprolactone mono (meth)acrylate, 3-vinylbenzoic acid and 4-vinylbenzoic acid.

Among these, (meth)acrylic acid, crotonic acid, maleic acid, fumaric acid, mono(2-(meth)acryloyloxyethyl)succinate, mono(2-(meth)acryloyloxyethyl)tetrahydrophthalate, mono(2-(meth)acryloyloxyethyl)hexahydrophthalate, mono (2-(meth)acryloyloxyethyl)hexahydroisophthalate and mono(2-(meth)acryloyloxyethyl)hexahydroterephthalate are preferred from the standpoint of the transparency, the heat resistance and the solubility in an alkali developer solution.

Furthermore, a compound having an ethylenic unsaturated group and an acid anhydride group, such as maleic anhydride, crotonic anhydride and itaconic anhydride, may be used as the raw material, and after the copolymerization, ring-opening reaction is performed with a suitable alcohol, such as methanol, ethanol or propanol, to convert to the structural unit represented by the general formula (1).

These compounds may be used solely or as a combination of two or more kinds thereof.

In the (meth)acrylic polymer, the total content of the structural units represented by the general formulae (1) and (2) is preferably from 5 to 60% by mol. When the total content is 5% by mol or more, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance, and when the total content is 60% by mol or less, the toughness may be enhanced without brittleness. In view of the factors, the total content of the structural unit represented by the general formula (1) is more preferably from 10 to 50% by mol, and particularly preferably from 15 to 40% by mol.

A compound that is a raw material of the structural unit represented by the general formula (3) in the (meth)acrylic polymer is not particularly limited, and examples thereof include an aliphatic (meth)acrylate, such as methyl(meth) acrylate, ethyl(meth)acrylate, propyl(meth)acrylate, isopropyl(meth)acrylate, butyl(meth)acrylate, isobutyl(meth)acrylate, sec-butyl(meth)acrylate, tert-butyl(meth)acrylate, butoxyethyl(meth)acrylate, pentyl(meth)acrylate, hexyl (meth)acrylate, 2-ethylhexyl(meth)acrylate, heptyl(meth) acrylate, octyl(meth)acrylate, nonyl(meth)acrylate, decyl (meth)acrylate, undecyl(meth)acrylate, lauryl(meth) acrylate, tridecyl(meth)acrylate, tetradecyl(meth)acrylate, pentadecyl(meth)acrylate, hexadecyl(meth)acrylate, stearyl (meth)acrylate, behenyl(meth)acrylate, methoxypolyethylene glycol(meth)acrylate, ethoxypolyethylene glycol(meth) acrylate, methoxypolypropylene glycol(meth)acrylate and ethoxypolypropylene glycol(meth)acrylate; an alicyclic (meth)acrylate, such as cyclopentyl(meth)acrylate, cyclohexyl(meth)acrylate, cyclopentyl(meth)acrylate, dicyclopentanyl(meth)acrylate, dicyclopentenyl(meth)acrylate and isobornyl(meth)acrylate; an aromatic (meth)acrylate, such as phenyl(meth)acrylate, benzyl(meth)acrylate, o-biphenyl (meth)acrylate, 1-naphthyl(meth)acrylate, 2-naphthyl(meth) acrylate, phenoxyethyl(meth)acrylate, p-cumylphenoxyethyl(meth)acrylate, o-phenylphenoxyethyl(meth)acrylate, 1-naphthoxyethyl(meth)acrylate, 2-naphthoxyethyl(meth) acrylate, phenoxypolyethylene glycol(meth)acrylate, nonylphenoxypolyethylene glycol(meth)acrylate and phenoxypolypropylene glycol(meth)acrylate; and a heterocyclic (meth)acrylate, such as 2-tetrahydrofurfuryl(meth)acrylate, N-(meth)acryloyloxyethylhexahydrophthalimide and 2-(meth)acryloyloxyethyl-N-carbazole.

Among these, an aliphatic (meth)acrylate, such as methyl (meth)acrylate, ethyl(meth)acrylate, propyl(meth)acrylate, isopropyl(meth)acrylate, butyl(meth)acrylate and 2-ethylhexyl(meth)acrylate; the aforementioned alicyclic (meth) acrylates; the aforementioned aromatic (meth)acrylates; and the aforementioned heterocyclic (meth)acrylates are preferred from the standpoint of the transparency and the heat resistance.

These compounds may be used solely or as a combination of two or more kinds thereof.

In the (meth)acrylic polymer, the content of the structural unit represented by the general formula (3) is preferably from 40 to 95% by mol. When the content is 40% by mol or more, the toughness may be enhanced without brittleness, and when the content is 95% by mol or less, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance. In view of the factors, the content of the structural unit represented by the general formula (3) is more preferably from 50 to 90% by mol, and particularly preferably from 60 to 85% by mol.

The (meth)acrylic polymer may further have a structural unit derived from a maleimide skeleton represented by the general formula (4) depending on necessity from the standpoint of the heat resistance.

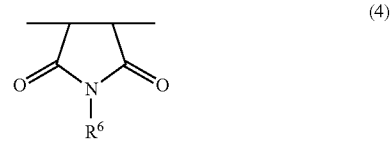

(4)

In the formula, $R^6$ represents a hydrogen atom or a monovalent organic group having from 1 to 20 carbon atoms. Preferred examples of the monovalent organic group having from 1 to 20 carbon atoms include those groups that are described for the specific examples of $R^2$.

A compound that is a raw material of the structural unit derived from a maleimide skeleton represented by the general formula (4) in the (meth)acrylic polymer is not particularly limited, and examples thereof include an alkylmaleimide, such as N-methylmaleimide, N-ethylmaleimide, N-propylmaleimide, N-isopropylmaleimide, N-2,2-dimethylpropylmaleimide, N-butylmaleimide, N-isobutylmaleimide, N-sec-butylmaleimide, N-tert-butylmaleimide, N-2-methyl-2-butylmaleimide, N-pentylmaleimide, N-2-pentylmaleimide, N-3-pentylmaleimide, N-hexylmaleimide, N-2-hexylmaleimide, N-3-hexylmaleimide, N-2-ethylhexylmaleimide, N-heptylmaleimide, N-octylmaleimide, N-nonylmaleimide, N-decylmaleimide, N-hydroxymethylmaleimide, N-2-hydroxyethylmaleimide and N-2-hydroxypropylmaleimide; a cycloalkylmaleimide, such as N-cyclopentylmaleimide, N-cyclohexylmaleimide, N-cycloheptylmaleimide, N-cyclooctylmaleimide, N-2-methylcyclohexylmaleimide, N-2-ethylcyclohexylmaleimide and N-2-chlorocyclohexylmaleimide; and an arylmaleimide, such as N-phenylmaleimide, N-2-methylphenylmaleimide, N-2-ethylphenylmaleimide, N-2-chlorophenylmaleimide and N-benzylmaleimide.

Among these, an alkylmaleimide, such as N methylmaleimide, N-ethylmaleimide, N-propylmaleimide, N-isopropylmaleimide, N-butylmaleimide, N-isobutylmaleimide, N-sec-butylmaleimide and N-tert-butylmaleimide; the aforementioned cycloalkylmaleimides; and the aforementioned arylmaleimides are preferably used, and N-isopropylmaleimide, N-cyclopentylmaleimide, N-cyclohexylmaleimide, N-2-methylcyclohexylmaleimide, N-phenylmaleimide and N-benzylmaleimide are more preferred, from the standpoint of the transparency and the heat resistance.

These compounds may be used solely or as a combination of two or more kinds thereof.

In the case where the (meth)acrylic polymer has the structural unit derived from a maleimide skeleton represented by the general formula (4), the content thereof is preferably from 1 to 60% by mol. When the content is 1% by mol or more, heat resistance due to the maleimide skeleton may be obtained, and when the content is 60% or less, sufficient transparency may be obtained, and good toughness may be obtained without brittleness. In view of the factors, the content of the structural unit derived from a maleimide skeleton represented by the general formula (4) is preferably from 3 to 50% by mol, and particularly preferably from 5 to 40% by mol.

The (meth)acrylic polymer may further has a structural unit other than the structural units represented by the general formulae (1) to (4).

A compound having an ethylenic unsaturated group that is a raw material of the structural unit is not particularly limited, and examples thereof include styrene, α-methylstyrene, β-methylstyrene, 3-methylstyrene, 4-methylstyrene, α, 2-dimethylstyrene, 2,4-dimethylstyrene, 2,5-dimethylstyrene, (meth)acrylonitrile, vinyl cyclohexyl ether, vinyl phenyl ether, vinyl benzyl ether, vinyl acetate, N-vinylpyrrolidone, N-vinylcarbazole, vinylpyridine, vinyl chloride and vinylidene chloride.

Among these, α-methylstyrene, β-methylstyrene, 3-methylstyrene, 4-methylstyrene, α, 2-dimethylstyrene, 2,4-dimethylstyrene, 2,5-dimethylstyrene, (meth)acrylonitrile, vinyl acetate and N-vinylcarbazole are preferred from the standpoint of the transparency and the heat resistance.

These compounds may be used solely or as a combination of two or more kinds thereof.

The synthesis method of the (meth)acrylic polymer is not particularly limited, and for example, the polymer may be obtained in such a manner that the compounds that are raw materials of the structural units represented by the general formula (1) to (3) and depending on necessity, the compound that is a raw material of the structural unit derived from a maleimide skeleton represented by the general formula (4) and the compound that is a raw material of the structural unit other than the structural units represented by the general formulae (1) to (4) are copolymerized under heating with a suitable thermal radical polymerization initiator. At this time, an organic solvent and/or water may be used as a reaction solvent depending on necessity. Furthermore, a chain transfer agent, a dispersant, a surfactant, an emulsifier and the like may be appropriately used in combination depending on necessity.

The thermal radical polymerization initiator is not particularly limited, and examples thereof include a ketone peroxide, such as methyl ethyl ketone peroxide, cyclohexanone peroxide and methylcyclohexanone peroxide; a peroxyketal, such as 1,1-bis(t-butylperoxy)cyclohexane, 1,1-bis(t-butylperoxy)-2-methylcyclohexane, 1,1-bis(t-butylperoxy)-3,3,5-trimethylcyclohexane, 1,1-bis(t-hexylperoxy)cyclohexane and 1,1-bis(t-hexylperoxy)-3,3,5-trimethylcyclohexane; a hydroperoxide, such as p-menthanehydroperoxide; a dialkyl peroxide, such as α,α'-bis(t-butylperoxy)diisopropylbenzene, dicumyl peroxide, t-butylcumyl peroxide and di-t-butyl peroxide; a diacyl peroxide, such as octanoyl peroxide, lauroyl peroxide, stearyl peroxide and benzoyl peroxide; a peroxycarbonate, such as bis(4-t-butylcyclohexyl)peroxydicarbonate, di-2-ethoxyethyl peroxydicarbonate, di-2-ethylhexyl peroxydicarbonate and di-3-methoxybutyl peroxycarbonate; a peroxyester, such as t-butyl peroxypivalate, t-hexyl peroxypivalate, 1,1,3,3-tetramethylbutyl peroxy-2-ethylhexanoate, 2,5-dimethyl-2,5-bis(2-ethylhexanoylperoxy)hexane, t-hexyl peroxy-2-ethylhexanoate, t-butyl peroxy-2-ethylhexanoate, t-butyl peroxyisobutyrate, t-hexyl peroxyisopropylmonocarbonate, t-butyl peroxy-3,5,5-trimethylhexanoate, t-butyl peroxylaurate, t-butyl peroxyisopropylmonocarbonate, t-butyl peroxy-2-ethylhexylmonocarbonate, t-butyl peroxybenzoate, t-hexyl peroxybenzoate, 2,5-dimethyl-2,5-bis(benzoylperoxy)hexane and t-butyl peroxyacetate; and an azo compound, such as 2,2'-azobisisobutyronitrile, 2,2'-azobis(2,4-dimethylvaleronitrile) and 2,2'-azobis(4-methoxy-2'-dimethylvaleronitrile).

The organic solvent used as the reaction solvent is not particularly limited as far as it dissolves the (meth)acrylic polymer, and examples thereof include an aromatic hydrocarbon, such as toluene, xylene, mesitylene, cumene and p-cymene; a linear ether, such as diethyl ether, tert-butyl methyl ether, cyclopentyl methyl ether and dibutyl ether; a cyclic ether, such as tetrahydrofuran and 1,4-dioxane; an alcohol, such as methanol, ethanol, isopropanol, butanol, ethylene glycol and propylene glycol; a ketone, such as acetone, methyl ethyl ketone, methyl isobutyl ketone, cyclohexanone and 4-hydroxy-4-methyl-2-pentanone; an ester, such as methyl acetate, ethyl acetate, butyl acetate, methyl lactate, ethyl lactate and γ-butyrolactone; a carbonate ester, such as ethylene carbonate and propylene carbonate; a bifunctional alcohol alkyl ether, such as ethylene glycol monomethyl ether, ethylene glycol monoethyl ether, ethylene glycol monobutyl ether, ethylene glycol dimethyl ether, ethylene glycol diethyl ether, propylene glycol monomethyl ether, propylene glycol monoethyl ether, propylene glycol dimethyl ether, propylene glycol diethyl ether, diethylene glycol monomethyl ether, diethylene glycol monoethyl ether, diethylene glycol monobutyl ether, diethylene glycol dimethyl ether and diethylene glycol diethyl ether; a bifunctional alcohol alkyl ether acetate, such as ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monomethyl ether acetate and diethylene glycol monoethyl ether acetate; and an amide, such as N,N-dimethylformamide, N,N-dimethylacetamide and N-methylpyrrolidone.

These compounds may be used solely or as a combination of two or more kinds thereof.

The weight average molecular weight of the component (A) is preferably from $1.0 \times 10^3$ to $1.0 \times 10^6$. When the weight average molecular weight is $1.0 \times 10^3$ or more, good toughness may be obtained without brittleness due to the large molecular weight, and when the weight average molecular weight is $1.0 \times 10^6$ or less, good solubility to a developer solution and good compatibility with the (meth)acrylate having a urethane bond (B) and the polyfunctional blocked isocyanate compound (C) may be obtained. In view of the factors, the weight average molecular weight of the component (A) is more preferably from $3.0 \times 10^3$ to $5.0 \times 10^5$, and particularly preferably from $5.0 \times 10^3$ to $3.0 \times 10^5$.

The weight average molecular weight in the present invention is a value obtained by measuring with gel permeation chromatography (GPC) and converting based on standard polystyrene.

The component (A) may be determined in terms of an acid value for making the component developable with an alkali developer solution described later. For example, in the case where an aqueous alkali developer solution containing an alkali aqueous solution is used as the alkali developer solution, the acid value is preferably from 30 to 250 mgKOH/g. When the acid value is 30 mgKOH/g or more, good solubility in the alkali developer solution may be obtained, and when the acid value is 250 mgKOH/g or less, good developer solution resistance (i.e., such a property that a portion that is not removed through development but remains as a pattern is not invaded by a developer solution) may be obtained. In view of the factors, the acid value of the component (A) is more preferably from 35 to 200 mgKOH/g, and particularly preferably from 40 to 170 mgKOH/g.

In the case where a quasi-aqueous alkali developer solution containing an alkali aqueous solution and at least one organic solvent is used as the alkali developer solution, the acid value is preferably from 20 to 200 mgKOH/g. When the acid value is 20 mgKOH/g or more, good solubility in the alkali developer solution may be obtained, and when the acid value is 200 mgKOH/g or less, good developer solution resistance may be obtained. In view of the factors, the acid value of the component (A) is more preferably from 25 to 170 mgKOH/g, and particularly preferably from 30 to 150 mgKOH/g.

The amount of the component (A) mixed is preferably from 10 to 85% by mass based on the total amount of the components (A) to (C) in the case where the component (E) is not contained. In the case where the component (E) is contained depending on necessity, the amount of the component (A) mixed is preferably from 10 to 85% by mass based on the total amount of the components (A) to (C) and the component (E). When the amount of the component (A) mixed is 10% by mass or more, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance, and when the amount of the component (A) mixed is 85% by mass or less, the toughness may be enhanced without brittleness. In view of the factors, the amount of the component (A) mixed is more preferably from 15 to 80% by mass, and particularly preferably from 20 to 75% by mass.

(B) (Meth)Acrylate Having Urethane Bond

In the present invention, a (meth)acrylate having a urethane bond (B) is used. The use of the (meth)acrylate having a urethane bond enhances the toughness.

The (meth)acrylate having a urethane bond (B) is not particularly limited, and examples thereof include the urethane (meth)acrylates shown by the items (1) to (4) below.

(1) A urethane (meth)acrylate obtained by reacting a bifunctional alcohol compound, a bifunctional isocyanate compound and a (meth)acrylate having a hydroxyl group.

(2) A urethane (meth)acrylate obtained by reacting a bifunctional alcohol compound, a bifunctional isocyanate compound and a (meth)acrylate having an isocyanate group.

(3) A urethane (meth)acrylate obtained by reacting a polyfunctional isocyanate compound and a (meth)acrylate having a hydroxyl group.

(4) A urethane (meth)acrylate obtained by reacting a polyfunctional alcohol compound and a (meth)acrylate having an isocyanate group.

Among these, a urethane (meth)acrylate that has at least one selected from the group consisting of an alicyclic structure, an aromatic ring structure and a heterocyclic structure in the molecule thereof is preferred from the standpoint of the transparency and the heat resistance.

The bifunctional alcohol compound, i.e., the diol compound, is not particularly limited, and examples thereof include a polyether diol compound, a polyester diol compound, a polycarbonate diol compound, a polycaprolactone diol compound, and other diol compounds than those described above.

The polyether diol compound is not particularly limited, and examples thereof include a polyether diol compound that is obtained by ring-opening (co)polymerization of at least one selected from cyclic ether compounds, such as ethylene oxide, propylene oxide, isobutene oxide, butyl glycidyl ether, butene-1-oxide, 3,3-bischloromethyloxetane, tetrahydrofuran, 2-methyltetrahydrofuran, 3-methyltetrahydrofuran, cyclohexene oxide, styrene oxide, phenyl glycidyl ether and glycidyl benzoate; a polyether diol compound obtained by ring-opening addition of at least one selected from the aforementioned cyclic ether compounds to an alicyclic diol compound, such as cyclohexanedimethanol, tricyclodecanedimethanol, hydrogenated bisphenol A and hydrogenated bisphenol F; and a polyether diol compound obtained by ring-opening addition of at least one selected from the aforementioned cyclic ether compounds to a bifunctional phenol compound, such as hydroquinone, resorcinol, catechol, bisphenol A, bisphenol F, bisphenol AF, biphenol and fluorenebisphenol.

The polyester diol compound is not particularly limited, and examples thereof include a polyester polyol compound obtained by copolymerizing a bifunctional carboxylic compound, such as malonic acid, succinic acid, glutaric acid, adipic acid, sebacic acid, tetrahydrophthalic acid, hexahydrophthalic acid, phthalic acid, isophthalic acid, terephthalic acid, maleic acid, fumaric acid and itaconic acid, and a diol compound, such as ethylene glycol, diethylene glycol, polyethylene glycol, propylene glycol, dipropylene glycol, polypropylene glycol, butanediol, dibutanediol, polybutanediol, pentanediol, neopentyl glycol, 3-methyl-1,5-pentanediol, hexanediol, heptanediol, octanediol, nonanediol, decanediol, cyclohexanedimethanol and tricyclodecanedimethanol.

The polycarbonate diol compound is not particularly limited, and examples thereof include a polycarbonate diol compound obtained by copolymerizing phosgene, triphosgene, a dialkyl carbonate, a diaryl carbonate and the like, and a diol compound, such as ethylene glycol, diethylene glycol, polyethylene glycol, propylene glycol, dipropylene glycol, polypropylene glycol, butanediol, dibutanediol, polybutanediol, pentanediol, neopentyl glycol, 3-methyl-1,5-pentanediol, hexanediol, heptanediol, octanediol, nonanediol, decanediol, cyclohexanedimethanol, tricyclodecanedimethanol, hydrogenated bisphenol A and hydrogenated bisphenol F.

The polycaprolactone diol compound is not particularly limited, and examples thereof include a polycaprolactone diol compound obtained by copolymerizing ε-caprolactone and a diol compound, such as ethylene glycol, diethylene glycol, polyethylene glycol, propylene glycol, dipropylene glycol, polypropylene glycol, butanediol, dibutanediol, polybutanediol, pentanediol, neopentyl glycol, 3-methyl-1,5-pentanediol, hexanediol, heptanediol, octanediol, nonanediol, decanediol, cyclohexanedimethanol and tricyclodecanedimethanol.

Examples of the other diol compounds include an aliphatic diol compound, such as ethylene glycol, diethylene glycol, propylene glycol, dipropylene glycol, butanediol, dibutanediol, pentanediol, neopentyl glycol, 3-methyl-1,5-pentanediol, hexanediol, heptanediol, octanediol, nonanediol and decanediol; an alicyclic diol compound, such as cyclohexanedimethanol, tricyclodecanedimethanol, hydrogenated bisphenol A and hydrogenated bisphenol F; a modified diol compound, such as a polybutadiene-modified diol compound, a hydrogenated polybutadiene-modified diol compound and a silicone-modified diol compound.

These diol compounds may be used solely or as a combination of two or more kinds thereof.

The bifunctional isocyanate compound is not particularly limited, and examples thereof include an aliphatic bifunctional isocyanate compound, such as tetramethylene diisocyanate, hexamethylene diisocyanate, 2,2,4-trimethylhexamethylene diisocyanate, decamethylene diisocyanate and dodecamethylene diisocyanate; an alicyclic bifunctional isocyanate compound, such as 1,3-bis(isocyanatomethyl)cyclohexane, isophorone diisocyanate, 2,5-bis(isocyanatomethyl) norbornene, bis(4-isocyanatocyclohexyl)methane, 1,2-bis (4-isocyanatocyclohexyl)ethane, 2,2-bis(4-isocyanatocyclohexyl)propane, 2,2-bis(4-isocyanatocyclohexyl)hexafluoropropane and bicycloheptane triisocyanate; an aromatic bifunctional isocyanate compound, such as 2,4'-diphenylmethane diisocyanate, 4,4'-diphenylmethane diisocyanate, 2,4-tolylene diisocyanate, 2,6-tolylene diisocyanate, naphthalene-1,5-diisocyanate, o-xylylene diisocyanate and m-xylylene diisocyanate.

These compounds may be used solely or as a combination of two or more kinds thereof.

The (meth)acrylate having a hydroxyl group is not particularly limited, and examples thereof include a monofunctional (meth)acrylate, such as 2-hydroxyethyl(meth)acrylate, 2-hydroxypropyl(meth)acrylate, 3-chloro-2-hydroxypropyl(meth)acrylate, 2-hydroxybutyl(meth)acrylate, 2-hydroxy-3-phenoxypropyl(meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate, an ethoxylated compound thereof, a propoxylated compound thereof, an ethoxylated propoxylated compound thereof and a caprolactone-modified compound thereof; a bifunctional (meth)acrylate, such as bis(2-(meth)acryloyloxyethyl)(2-hydroxyethyl)isocyanurate, an ethoxylated compound thereof, a propoxylated compound thereof, an ethoxylated propoxylated compound thereof and a caprolactone-modified compound thereof; a bifunctional epoxy (meth)acrylate, such as cyclohexanedimethanol type epoxy di(meth)acrylate, tricyclodecanedimethanol type epoxy di(meth)acrylate, hydrogenated bisphenol A type epoxy di(meth)acrylate, hydrogenated bisphenol F type epoxy di(meth)acrylate, hydroquinone type epoxy di(meth)acrylate, resorcinol type epoxy di(meth)acrylate, catechol type epoxy di(meth)acrylate, bisphenol A type epoxy di(meth)acrylate, bisphenol F type epoxy di(meth)acrylate, bisphenol AF type epoxy di(meth)acrylate, biphenol type epoxy di(meth)acrylate, fluorenebisphenol type epoxy di(meth)acrylate and monoallyl isocyanurate type epoxy di(meth)acrylate; a trifunctional or higher (meth)acrylate, such as pentaerythritol tri(meth)acrylate, dipentaerythritol tetra(meth)acrylate and dipentaerythritol penta(meth)acrylate, an ethoxylated compound thereof, a propoxylated compound thereof, an ethoxylated propoxylated compound thereof and a caprolactone-modified compound thereof; a trifunctional or higher epoxy (meth)acrylate, such as phenol novolac type epoxy (meth)acrylate, cresol novolac type epoxy poly(meth)acrylate and isocyanuric acid type epoxy tri(meth)acrylate.

These compounds may be used solely or as a combination of two or more kinds thereof.

The ethoxylated compound of a (meth)acrylate, the propoxylated compound thereof, and the ethoxylated propoxylated compound thereof herein mean such (meth)acrylates that are obtained by using, instead of the alcohol compound or phenol compound as a raw material (for example, a compound represented by HO—$R^8$ for the case of a monofunctional (meth)acrylate, $CH_2$=$CH(R^7)$—COO—$R^8$ (wherein $R^7$ represents a hydrogen atom or a methyl group, and $R^8$ represents a monovalent organic group)), an alcohol compound with a structure having at least one ethylene oxide added to the alcohol compound or the phenol compound, an alcohol compound with a structure having at least one propylene oxide added thereto, and an alcohol compound with a structure having at least one ethylene oxide and propylene oxide added thereto, respectively (for example, the ethoxylated compound may be represented by $CH_2$=$CH(R^7)$—COO—$(CH_2CH_2O)_q$—$R^8$ (wherein q represents an integer of 1 or more, and $R^7$ and $R^8$ have the same meanings as above). The caprolactone-modified compound herein means a (meth)acrylate that is obtained by using an alcohol compound obtained by modifying the alcohol compound as a raw material of the (meth)acrylate with ε-caprolactone (for example, a caprolactone-modified compound of a monofunctional (meth)acrylate may be represented by $CH_2$=$CH(R^7)$—COO—$((CH_2)_5COO)_q$—$R^8$ (wherein q, $R^7$ and $R^8$ have the same meanings as above).

The (meth)acrylate having an isocyanate group is not particularly limited, and examples thereof include N-(meth)acryloyl isocyanate, (meth)acryloyloxymethyl isocyanate, 2-(meth)acryloyloxyethyl isocyanate, 2-(meth)acryloyloxyethoxyethyl isocyanate and 1,1-bis((meth)acryloyloxymethyl)ethyl isocyanate.

These compounds may be used solely or as a combination of two or more kinds thereof.

The polyfunctional isocyanate compound is not particularly limited, and examples thereof include the aforementioned bifunctional isocyanate compounds; and a polymeric compound of the aforementioned bifunctional isocyanate compounds, such as a uretodione type dimer, and isocyanurate type and biuret type trimers. The two or three bifunctional isocyanate compounds constituting the polymeric compound may be the same as or different from each other.

These compounds may be used solely or as a combination of two or more kinds thereof.

The polyfunctional alcohol compound is not particularly limited, and examples thereof include the aforementioned bifunctional alcohol compounds; a trifunctional or higher alcohol compound, such as trimethylolpropane, pentaerythritol, ditrimethylolpropane, dipentaerythritol and tris(2-hydroxyethyl)isocyanurate, an adduct obtained by ring-opening addition of at least one selected from the aforementioned cyclic ether compounds thereto, and a caprolactone-modified compound thereof; and an alcohol compound obtained by ring-opening addition of at least one selected from the aforementioned cyclic ether compounds to a trifunctional or higher phenol compound, such as phenol novolac and cresol novolac, and a caprolactone-modified compound thereof.

These compounds may be used solely or as a combination of two or more kinds thereof.

The (meth)acrylate having a urethane bond may further contain a carboxyl group depending on necessity from the standpoint of the heat resistance and the solubility to an alkali developer solution.

The (meth)acrylate having a urethane bond that further has a carboxyl group is not particularly limited, and examples thereof include such a urethane (meth)acrylate that is obtained by using a carboxyl group-containing diol compound in combination with the diol compound or instead of the diol compound on synthesizing the aforementioned urethane (meth)acrylate.

The carboxyl group-containing diol compound is not particularly limited, and examples thereof include 2,2-dimethylolbutanoic acid, 2,2-dimethylolpropionic acid, 2,2-dimethylolbutyric acid and 2,2-dimethylolpentanoic acid.

These compounds may be used solely or as a combination of two or more kinds thereof.

The (meth)acrylate having a carboxyl group and a urethane bond may be determined in terms of an acid value for making the component developable with an alkali developer solution described later. The acid value thereof is preferably from 5 to 200 mgKOH/g. When the acid value is 5 mgKOH/g or more, good solubility in the alkali developer solution may be obtained, and when the acid value is 200 mgKOH/g or less, good developer solution resistance may be obtained. In view of the factors, the acid value of the (meth)acrylate having a carboxyl group and a urethane bond is more preferably from 10 to 170 mgKOH/g, and particularly preferably from 15 to 150 mgKOH/g.

The amount of the component (B) mixed is preferably from 10 to 85% by mass based on the total amount of the components (A) to (C) in the case where the component (E) is not contained. When the amount of the component (B) mixed is 10% by mass or more, the toughness may be enhanced without brittleness, and when the amount of the component (B) mixed is 85% by mass or less, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance. In view of the factors, the amount of the component (B) mixed is more preferably from 15 to 80% by mass, and particularly preferably from 20 to 75% by mass.

In the case where the component (E) is contained depending on necessity, the amount of the component (B) mixed is preferably from 5 to 80% by mass based on the total amount of the components (A) to (C) and the component (E). When the amount of the component (B) mixed is 5% by mass or more, the toughness may be enhanced without brittleness, and when the amount of the component (B) mixed is 80% by mass or less, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance. In view of the factors, the amount of the component (B) mixed is more preferably from 10 to 75% by mass, and particularly preferably from 15 to 70% by mass.

(C) Polyfunctional Blocked Isocyanate Compound

The polyfunctional blocked isocyanate compound is a compound that is formed through reaction of a polyfunctional isocyanate compound and a blocking agent. The compound is temporarily inactivated with a group derived from the blocking agent, and forms an isocyanate group by releasing the group derived from the blocking agent on heating to a prescribed temperature. The use of the polyfunctional blocked isocyanate compound forms a new crosslinked structure through reaction of the isocyanate group formed from the polyfunctional blocked isocyanate compound on heating and the hydroxyl group and/or carboxyl group of the component (A), thereby enhancing the heat resistance and the environmental reliability.

The polyfunctional isocyanate compound that is capable of being reacted with the blocking agent is not particularly limited, and examples thereof include an aromatic polyfunctional isocyanate compound, such as 2,4'-diphenylmethane diisocyanate, 4,4'-diphenylmethane diisocyanate, 2,4-tolylene diisocyanate, 2,6-tolylene diisocyanate, naphthalene-1,5-diisocyanate, o-xylylene diisocyanate and m-xylylene diisocyanate; an alicyclic polyfunctional isocyanate compound, such as 1,3-bis(isocyanatomethyl)cyclohexane, isophorone diisocyanate, 2,5-bis(isocyanatomethyl)norbornene, bis(4-isocyanatocyclohexyl)methane, 1,2-bis(4-isocyanatocyclohexyl)ethane, 2,2-bis(4-isocyanatocyclohexyl)propane, 2,2-bis(4-isocyanatocyclohexyl)hexafluoropropane and bicycloheptane triisocyanate; and an aliphatic polyfunctional isocyanate compound, such as tetramethylene diisocyanate, hexamethylene diisocyanate, 2,2,4-trimethylhexamethylene diisocyanate, decamethylene diisocyanate and dodecamethylene diisocyanate.

The polyfunctional isocyanate compound preferably has at least one selected from an alicyclic structure and an aliphatic structure from the standpoint of the transparency and the heat resistance, and among these, the alicyclic polyfunctional isocyanate compound and the aliphatic polyfunctional isocyanate compound are preferred.

The polyfunctional isocyanate compound may be a polymeric compound, such as a uretodione type dimer, and isocyanurate type and biuret type trimers, and two or three polyfunctional isocyanate compounds constituting the polymeric compound may be the same as or different from each other. In the case where they are different from each other, a combination of polyfunctional isocyanate compounds of different kinds, such as a combination of an alicyclic polyfunctional isocyanate compound and an aliphatic polyfunctional isocyanate compound, may be used.

The polyfunctional isocyanate compound may be used solely or as a combination of two or more kinds thereof.

The blocking agent preferably has active hydrogen, and examples thereof include an active methylene compound, such as a malonate diester, an acetoacetate ester, dinitrile malonate, acetylacetone, methylenedisulfone, dibenzoylmethane, dipivalylmethane and an acetonedicarboxylate diester; an oxime compound, such as acetone oxime, methyl ethyl ketone oxime, diethyl ketone oxime, methyl isobutyl ketone oxime and cyclohexanone oxime; a phenol compound, such as phenol, an alkylphenol and an alkylnaphthol; and a lactam compound, such as γ-butyrolactam, δ-valerolactam and ε-caprolactam.

Among these, the active methylene compound; the oxime compound; and the lactam compound are preferred from the standpoint of the transparency and the heat resistance.

The blocking agent may be used solely or as a combination of two or more kinds thereof.

The amount of the component (C) mixed is preferably from 1 to 40% by mass based on the total amount of the components (A) to (C) in the case where the component (E) is not contained. In the case where the component (E) is contained depending on necessity, the amount of the component (C) mixed is preferably from 1 to 40% by mass based on the total amount of the components (A) to (C) and the component (E). When the amount of the component (C) mixed is 1% by mass or more, the hydroxyl group and/or carboxyl group of the component (A) and the isocyanate group formed from the polyfunctional blocked isocyanate compound as the component (C) may be reacted to form a sufficient crosslinked structure, thereby enhancing the heat resistance, and when the amount of the component (C) mixed is 40% by mass or less, the toughness may be enhanced without brittleness. In view of the factors, the amount of the component (C) mixed is more preferably from 3 to 35% by mass, and particularly preferably from 5 to 30% by mass.

(D) Radical Polymerization Initiator

In the present invention, a radical polymerization initiator (D) is used. The use of the radical polymerization initiator (D) initiates radical polymerization of the component (B) by heating or irradiation of active light, such as an ultraviolet ray and a visible ray, thereby curing.

The radical polymerization initiator (D) is not particularly limited as far as it initiates radical polymerization by heating or irradiation of active light, such as an ultraviolet ray and a visible ray, and examples thereof include a thermal radical polymerization initiator and a photoradical polymerization initiator.

The thermal radical polymerization initiator is not particularly limited, and preferred examples thereof include compounds that are similar to thermal radical polymerization initiators used on synthesizing the aforementioned (meth)acrylic polymer.

Among these, a diacyl peroxide, a peroxyester and an azo compound are preferred from the standpoint of the curing property, the transparency and the heat resistance.

The photoradical polymerization initiator is not particularly limited as far as it initiates radical polymerization by irradiation of active light, such as an ultraviolet ray and a visible ray, and examples thereof include a benzoyl ketal, such as 2,2-dimethoxy-1,2-diphenylethan-1-one; an α-hydroxyketone, such as 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one and 2-hydroxy-1-{4-[4-[2-hydroxy-2-methylpropionyl)benzyl]phenyl}-2-methylpropan-1-one; a glyoxylate ester, such as methyl phenylglyoxylate, ethyl phenylglyoxylate, 2-(2-hydroxyethoxy)ethyl oxyphenylacetate and 2-(2-oxo-2-phenylacetoxyethoxy)ethyl oxyphenylacetate; an α-aminoketone, such as 2-benzyl-2-dimethylamino-1-(4-morpholin-4-ylphenyl)-1-butan-1-one, 2-dimethylamino-2-(4-methylbenzyl)-1-(4-morpholin-4-ylphenyl)-butan-1-one and 1,2-methyl-1-[4-(methylthio)phenyl]-(4-morpholin)-2-ylpropan-1-one; an oxime ester, such as 1,2-octanedione, 1-[4-(phenylthio),2-(O-benzyloxime)] and ethanone, 1-[9-ethyl-6-(2-methylbenzoyl)-9H-carbazol-3-yl], 1-(O-acetyloxime); a phosphine oxide, such as bis(2,4,6-trimethylbenzoyl)phenyl phosphine oxide, bis(2,6-dimethoxybenzoyl)-2,4,4-trimethylpentyl phosphine oxide and 2,4,6-trimethylbenzoyldiphenyl phosphine oxide; a 2,4,5-triarylimidazole dimer, such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer and 2-(p-methoxyphenyl)-4,5-diphenylimidazole dimer; a benzophenone compound, such as benzophenone, N,N'-tetramethyl-4,4'-diaminobenzophenone, N,N'-tetraethyl-4,4'-diaminobenzophenone and 4-methoxy-4'-dimethylaminobenzophenone; a quinone compound, such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone and 2,3-dimethylanthraquinone; a benzoin ether, such as benzoin methyl ether, benzoin ethyl ether and benzoin phenyl ether; a benzoin compound, such as benzoin, methylbenzoin and ethylbenzoin; a benzyl compound, such as benzyldimethylketal; an acridine compound, such as 9-phenylacridine and 1,7-bis(9,9'-acridinylheptane); N-phenylglycine; and coumarin.

In the 2,4,5-triarylimidazole dimer, the substituents on the aryl groups at the triarylimidazole moieties may be the same as each other to provide a symmetric compound or may be different from each other to provide an asymmetric compound.

Among these, the α-hydroxyketone; the glyoxylate ester; the oxime ester; and the phosphine oxide are preferred from the standpoint of the curing property and the transparency.

The radical polymerization initiator (including the thermal radical polymerization initiator and the photoradical polymerization initiator) may be used solely or as a combination of two or more kinds thereof, and may also be used in combination with a suitable sensitizer.

The amount of the component (D) mixed is preferably from 0.01 to 10 parts by mass per 100 parts by mass in total of the components (A) to (C) in the case where the component (E) is not contained. In the case where the component (E) is contained depending on necessity, the amount of the component (D) mixed is preferably from 0.01 to 10 parts by mass per 100 parts by mass in total of the components (A) to (C) and the component (E). When the amount of the component (D) mixed is 0.01 part by mass or more, curing may be performed sufficiently, and when the amount of the component (D) mixed is 10 parts by mass or less, good transparency may be obtained. In view of the factors, the amount of the component (D) mixed is more preferably from 0.05 to 7 parts by mass, and particularly preferably from 0.1 to 5 parts by mass.

(E) (Meth)Acrylate Having No Urethane Bond

In the present invention, (E) a (meth)acrylate having no urethane bond may be used depending on necessity in such a range that does not impair the advantages of the present invention.

The (meth)acrylate having no urethane bond (E) is not particularly limited, and for example, a monofunctional compound, a bifunctional compound and a trifunctional or higher compound may be used.

The monofunctional (meth)acrylate is not particularly limited, and examples thereof include an aliphatic (meth)acrylate, such as methyl(meth)acrylate, ethyl(meth)acrylate, propyl(meth)acrylate, isopropyl(meth)acrylate, butyl(meth)acrylate, isobutyl(meth)acrylate, sec-butyl(meth)acrylate, tert-butyl(meth)acrylate, butoxyethyl(meth)acrylate, pentyl (meth)acrylate, hexyl(meth)acrylate, 2-ethylhexyl(meth)acrylate, heptyl(meth)acrylate, octylheptyl(meth)acrylate, nonyl(meth)acrylate, decyl(meth)acrylate, undecyl(meth)acrylate, dodecyl(meth)acrylate, tridecyl(meth)acrylate, tetradecyl(meth)acrylate, pentadecyl(meth)acrylate, hexadecyl (meth)acrylate, octadecyl(meth)acrylate, behenyl(meth)acrylate, 2-hydroxyethyl(meth)acrylate, 2-hydroxypropyl (meth)acrylate, 3-chloro-2-hydroxypropyl(meth)acrylate, 2-hydroxybutyl(meth)acrylate, methoxypolyethylene glycol (meth)acrylate, ethoxypolyethylene glycol(meth)acrylate, methoxypolypropylene glycol(meth)acrylate, ethoxypolypropylene glycol(meth)acrylate and mono(2-(meth)acryloyloxyethyl)succinate, an ethoxylated compound thereof, a propoxylated compound thereof, an ethoxylated propoxylated compound thereof and a caprolactone-modified compound thereof; an alicyclic (meth)acrylate, such as cyclopentyl(meth)acrylate, cyclohexyl(meth)acrylate, dicyclopentanyl(meth)acrylate, dicyclopentenyl(meth)acrylate, isobornyl(meth)acrylate, mono(2-(meth)acryloyloxyethyl)tetrahydrophthalate and mono(2-(meth)acryloyloxyethyl)hexahydrophthalate, an ethoxylated compound thereof, a propoxylated compound thereof, an ethoxylated propoxylated compound thereof and a caprolactone-modified compound thereof; an aromatic (meth)acrylate, such as phenyl(meth)acrylate, benzyl(meth)acrylate, o-biphenyl (meth)acrylate, 1-naphthyl(meth)acrylate, 2-naphthyl(meth)acrylate, phenoxyethyl(meth)acrylate, p-cumylphenoxyethyl(meth)acrylate, o-phenylphenoxyethyl(meth)acrylate, 1-naphthoxyethyl(meth)acrylate, 2-naphthoxyethyl(meth) acrylate, phenoxypolyethylene glycol(meth)acrylate, nonylphenoxypolyethylene glycol(meth)acrylate, phenoxypolypropylene glycol(meth)acrylate, 2-hydroxy-3-phenoxypropyl(meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate, an ethoxylated compound thereof, a propoxylated compound thereof, an ethoxylated propoxylated compound thereof and a caprolactone-modified compound thereof; and a heterocyclic (meth)acrylate, such as 2-tetrahydrofurfuryl(meth)acrylate, N-(meth)acryloyloxyethyltetrahydrophthalimide, N-(meth)acryloyloxyethylhexahydrophthalimide, isocyanuric acid mono(meth)

acrylate and 2-(meth)acryloyloxyethyl-N-carbazole, an ethoxylated compound thereof, a propoxylated compound thereof, an ethoxylated propoxylated compound thereof and a caprolactone-modified compound thereof.

Among these, a compound having at least one selected from the group consisting of an alicyclic structure, an aromatic structure and a heterocyclic structure in the molecule thereof is preferred from the standpoint of the transparency and the heat resistance, and specific preferred examples thereof include an alicyclic (meth)acrylate, such as cyclohexyl(meth)acrylate, dicyclopentanyl(meth)acrylate, dicyclopentenyl(meth)acrylate and isobornyl(meth)acrylate, an ethoxylated compound thereof, a propoxylated compound thereof, an ethoxylated propoxylated compound thereof and a caprolactone-modified compound thereof; an aromatic (meth)acrylate, such as benzyl(meth)acrylate, phenoxyethyl(meth)acrylate, p-cumylphenoxyethyl(meth)acrylate, o-phenylphenoxyethyl(meth)acrylate, phenoxypolyethylene glycol(meth)acrylate, phenoxypolypropylene glycol (meth)acrylate, 2-hydroxy-3-phenoxypropyl(meth)acrylate and 2-hydroxy-3-(o-phenylphenoxy)propyl(meth)acrylate, an ethoxylated compound thereof, a propoxylated compound thereof, an ethoxylated propoxylated compound thereof and a caprolactone-modified compound thereof; and a heterocyclic (meth)acrylate, such as N-(meth)acryloyloxyethyltetrahydrophthalimide, N-(meth)acryloyloxyethylhexahydrophthalimide, isocyanuric acid mono(meth)acrylate and 2-(meth)acryloyloxyethyl-N-carbazole, an ethoxylated compound thereof, a propoxylated compound thereof, an ethoxylated propoxylated compound thereof and a caprolactone-modified compound thereof. The ethoxylated compound, the propoxylated compound and the ethoxylated propoxylated compound herein have the same meanings as above.

The bifunctional (meth)acrylate is not particularly limited, and examples thereof include an aliphatic (meth)acrylate, such as ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, 1,3-propanediol di(meth)acrylate, 2-methyl-1,3-propanediol di(meth)acrylate, 2-butyl-2-ethyl-1,3-propanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 1,9-nonanediol di(meth)acrylate, 1,10-decanediol di(meth)acrylate and glycerin di(meth)acrylate, an ethoxylated compound thereof, a propoxylated compound thereof, an ethoxylated propoxylated compound thereof and a caprolactone-modified compound thereof; an aliphatic epoxy (meth)acrylate, such as ethylene glycol type epoxy di(meth)acrylate, diethylene glycol type epoxy di(meth)acrylate, polyethylene glycol type epoxy di(meth)acrylate, propylene glycol type epoxy di(meth)acrylate, dipropylene glycol type epoxy di(meth)acrylate, polypropylene glycol type epoxy di(meth)acrylate, 1,3-propanediol type epoxy di(meth)acrylate, 2-methyl-1,3-propane diol type epoxy di(meth)acrylate, 2-butyl-2-ethyl-1,3-propanediol type epoxy di(meth)acrylate, 1,4-butanediol type epoxy di(meth)acrylate, neopentyl glycol type epoxy di(meth)acrylate, 3-methyl-1,5-pentanediol type epoxy di(meth)acrylate, 1,6-hexanediol type epoxy di(meth)acrylate, 1,9-nonanediol type epoxy di(meth)acrylate and 1,10-decanediol type epoxy di(meth)acrylate; an alicyclic (meth)acrylate, such as cyclohexanedimethanol di(meth)acrylate, tricyclodecanedimethanol di(meth)acrylate, hydrogenated bisphenol A di(meth)acrylate and hydrogenated bisphenol F di(meth)acrylate, an ethoxylated compound thereof, a propoxylated compound thereof, an ethoxylated propoxylated compound thereof and a caprolactone-modified compound thereof; an alicyclic epoxy (meth)acrylate, such as cyclohexanedimethanol type epoxy di(meth)acrylate, tricyclodecanedimethanol type epoxy di(meth)acrylate, hydrogenated bisphenol A type epoxy di(meth)acrylate and hydrogenated bisphenol F type epoxy di(meth)acrylate; an aromatic (meth)acrylate, such as hydroquinone di(meth)acrylate, resorcinol di(meth)acrylate, catechol di(meth)acrylate, bisphenol A di(meth)acrylate, bisphenol F di(meth)acrylate, bisphenol AF di(meth)acrylate, biphenol di(meth)acrylate and fluorenebisphenol di(meth)acrylate, an ethoxylated compound thereof, a propoxylated compound thereof, an ethoxylated propoxylated compound thereof and a caprolactone-modified compound thereof; an aromatic epoxy (meth)acrylate, such as hydroquinone type epoxy di(meth)acrylate, resorcinol type epoxy di(meth)acrylate, catechol type epoxy di(meth)acrylate, bisphenol A type epoxy di(meth)acrylate, bisphenol F type epoxy di(meth)acrylate, bisphenol AF type epoxy di(meth)acrylate, biphenol type epoxy di(meth)acrylate and fluorenebisphenol type epoxy di(meth)acrylate; a heterocyclic (meth)acrylate, such as bis(2-(meth)acryloyloxyethyl) (2-hydroxyethyl) isocyanurate, an ethoxylated compound thereof, a propoxylated compound thereof, an ethoxylated propoxylated compound thereof and a caprolactone-modified compound thereof; and heterocyclic (meth)acrylate, such as monoallyl isocyanurate type epoxy di(meth)acrylate. The ethoxylated compound, the propoxylated compound, the ethoxylated propoxylated compound and caprolactone-modified compound herein have the same meanings as above.

Among these, a compound having at least one selected from the group consisting of an alicyclic structure, an aromatic structure and a heterocyclic structure in the molecule thereof is preferred from the standpoint of the transparency and the heat resistance, and specific preferred examples thereof include the aforementioned alicyclic (meth)acrylate, an ethoxylated compound thereof, a propoxylated compound thereof, an ethoxylated propoxylated compound thereof and a caprolactone-modified compound thereof; the aforementioned alicyclic epoxy (meth)acrylate; an aromatic (meth)acrylate, such as bisphenol A di(meth)acrylate, bisphenol F di(meth)acrylate, bisphenol AF di(meth)acrylate, biphenol di(meth)acrylate and fluorenebisphenol di(meth)acrylate, an ethoxylated compound thereof, a propoxylated compound thereof, an ethoxylated propoxylated compound thereof and a caprolactone-modified compound thereof; an aromatic epoxy (meth)acrylate, such as bisphenol A type epoxy di(meth)acrylate, bisphenol F type epoxy di(meth)acrylate, bisphenol AF type epoxy di(meth)acrylate, biphenol type epoxy di(meth)acrylate and fluorenebisphenol type epoxy di(meth)acrylate; and the aforementioned heterocyclic (meth)acrylate, an ethoxylated compound thereof, a propoxylated compound thereof, an ethoxylated propoxylated compound thereof and a caprolactone-modified compound thereof.

Examples of the trifunctional or higher (meth)acrylate include an aliphatic (meth)acrylate, such as trimethylolpropane tri(meth)acrylate, pentaerythritol tri(meth)acrylate, pentaerythritol tetra(meth)acrylate, ditrimethyolopropane tetra(meth)acrylate, dipentaerythritol penta(meth)acrylate and dipentaerythritol hexa(meth)acrylate, an ethoxylated compound thereof, a propoxylated compound thereof, an ethoxylated propoxylated compound thereof and a caprolactone-modified compound thereof; a aromatic epoxy (meth)acrylate, such as phenol novolac type epoxy (meth)

acrylate and cresol novolac type epoxy poly(meth)acrylate; a heterocyclic (meth)acrylate, such as tris(2-(meth)acryloyloxyethyl)isocyanurate, an ethoxylated compound thereof, a propoxylated compound thereof, an ethoxylated propoxylated compound thereof and a caprolactone-modified compound thereof; and heterocyclic epoxy (meth)acrylate, such as isocyanuric acid type epoxy tri(meth)acrylate. The ethoxylated compound, the propoxylated compound, the ethoxylated propoxylated compound and caprolactone-modified compound herein have the same meanings as above.

Among these, a compound having at least one selected from the group consisting of an alicyclic structure, an aromatic structure and a heterocyclic structure in the molecule thereof is preferred from the standpoint of the transparency and the heat resistance, and specific preferred examples thereof include the aforementioned aromatic epoxy (meth)acrylate; the aforementioned heterocyclic (meth)acrylate; and aforementioned isocyanuric acid type epoxy (meth)acrylate.

The (meth)acrylate having no urethane bond may be used solely or as a combination of two or more kinds thereof, and may also be used in combination with another polymerizable compound.

The amount of the component (E) mixed is preferably from 5 to 80% by mass based on the total amount of the components (A) to (C) and (E). When the amount of the component (E) mixed is 5% by mass or more, a sufficient crosslinked structure may be formed through reaction with the component (B), thereby enhancing the heat resistance, and when the amount of the component (E) mixed is 80% by mass or less, the toughness may be enhanced without brittleness. In view of the factors, the amount of the component (E) mixed is more preferably from 10 to 60% by mass, and particularly preferably from 15 to 40% by mass.

Additional Components

The resin composition for forming an optical waveguide of the present invention may further contain so-called additives, such as an antioxidant, a yellowing preventing agent, an ultraviolet ray absorbent, a visible light absorbent, a colorant, a plasticizer, a stabilizer and a filler, depending on necessity in such a ratio that does not impair the advantages of the present invention.

Organic Solvent

The resin composition for forming an optical waveguide of the present invention may be diluted with a suitable organic solvent and may be used as a resin varnish for forming an optical waveguide. The organic solvent used herein is not particularly limited as far as it is capable of dissolving the resin composition, and preferred examples thereof include compounds that are similar to the organic solvents used as the reaction solvent capable of dissolving the (meth)acrylic polymer.

The organic solvent may be used solely or as a combination of two or more kinds thereof. The solid concentration in the resin varnish is generally preferably from 10 to 80% by mass.

Preparation of Resin Composition for Forming Optical Waveguide

The resin composition for forming an optical waveguide may be prepared preferably by mixing through agitation. The agitation method is not particularly limited, and agitation with a propeller is preferred from the standpoint of the agitation efficiency. The rotation speed of the propeller on agitation is not particularly limited and is preferably from 10 to 1,000 rpm. When the rotation speed of the propeller is 10 rpm or more, the components may be sufficiently mixed, and when the rotation speed is 1,000 rpm or less, entrainment of air bubbles on rotation of the propeller may be reduced. In view of the factors, the rotation speed of the propeller is more preferably from 50 to 800 rpm, and particularly preferably from 100 to 500 rpm.

The agitation time is not particularly limited and is preferably from 1 to 24 hours. When the agitation time is 1 hour or more, the components may be sufficiently mixed, and when the agitation time is 24 hours or less, the preparation time may be decreased, thereby enhancing the productivity.

The resin composition for forming an optical waveguide thus prepared is preferably filtered with a filter having a pore diameter of 50 µm or less. The use of a filter having a pore diameter of 50 µm or less removes large foreign matters, by which repellency on coating may be prevented, and light scattering may be suppressed to prevent the transparency from being impaired. In view of the factors, the resin composition is more preferably filtered with a filter having a pore diameter of 30 µm or less, and particularly preferably filtered with a filter having a pore diameter of 10 µm or less.

The resin composition or resin varnish for forming an optical waveguide thus prepared is preferably defoamed under reduced pressure. The defoaming method is not particularly limited, and examples thereof include a method using a vacuum pump and a bell jar, and a defoaming equipment with a vacuuming device. The pressure on the pressure reduction is not particularly limited and is preferably such a pressure that the low boiling point components contained in the resin composition are not boiled. The defoaming time under reduced pressure is not particularly limited and is preferably from 3 to 60 minutes. When the defoaming time under reduced pressure is 3 minutes or more, air bubbles dissolved in the resin composition may be removed, and the defoaming time is 60 minutes or less, the defoaming time may be shortened without volatilization of the organic solvent contained in the resin composition, thereby enhancing the productivity.

Resin Film for forming Optical Waveguide

The resin film for forming an optical waveguide of the present invention will be described below.

The resin film for forming an optical waveguide of the present invention is formed with the resin composition for forming an optical waveguide, and may be produced conveniently by coating the resin composition for forming an optical waveguide, which contains the components (A) to (D) and depending on necessity the component (E), on a suitable supporting film. In the case where the resin composition for forming an optical waveguide is the resin varnish for forming an optical waveguide having been diluted with the organic solvent, the resin film may be produced by coating the resin varnish on a supporting film, and then removing the organic solvent.

The supporting film is not particularly limited, and examples thereof include polyester, such as polyethylene terephthalate, polybutylene terephthalate and polyethylene naphthalate; polyolefin, such as polyethylene and polypropylene; polycarbonate, polyamide, polyimide, polyamideimide, polyetherimide, polyether sulfide, polyether sulfone, polyether ketone, polyphenylene ether, polyphenylene sulfide, polylarylate, polysulfone and a liquid crystal polymer.

Among these, polyethylene terephthalate, polybutylene terephthalate, polyethylene naphthalate, polypropylene, polycarbonate, polyamide, polyimide, polyamideimide, polyphenylene ether, polyphenylene sulfide, polyarylate and polysulfone are preferred from the standpoint of the flexibility and the toughness.

A film having been subjected to a releasing treatment with a silicone compound, a fluorine-containing compound or the like may be used depending on necessity from the standpoint of enhancing the releasing property to the resin layer.

The thickness of the supporting film may appropriately vary depending on the target flexibility and is preferably from 3 to 250 µm. When the thickness of the supporting film is 3 µm or more, sufficient film strength may be obtained, and when the thickness of the supporting film is 250 µm or less, sufficient flexibility may be obtained. In view of the factors, the thickness of the supporting film is more preferably from 5 to 200 µm, and particularly preferably from 7 to 150 µm.

A protective film may be adhered depending on necessity to the resin layer of the resin film for forming an optical waveguide, which is produced by coating the resin composition for forming an optical waveguide on a supporting film, thereby forming a three-layer structure containing the supporting film, the resin layer and the protective film.

The protective film is not particularly limited, and polyester, such as polyethylene terephthalate, polybutylene terephthalate and polyethylene naphthalate; polyolefin, such as polyethylene and polypropylene; and the like are preferred from the standpoint of the flexibility and the toughness. A film having been subjected to a releasing treatment with a silicone compound, a fluorine-containing compound or the like may be used depending on necessity from the standpoint of enhancing the releasing property to the resin layer.

The thickness of the protective film may appropriately vary depending on the target flexibility and is preferably from 10 to 250 µm. When the thickness of the protective film is 10 µm or more, sufficient film strength may be obtained, and when the thickness of the protective film is 250 µm or less, sufficient flexibility may be obtained. In view of the factors, the thickness of the protective film is more preferably from 15 to 200 µm, and particularly preferably from 20 to 150 µm.

The thickness of the resin layer of the resin film for forming an optical waveguide of the present invention is not particularly limited and is generally preferably from 5 to 500 µm in terms of thickness after drying. When the thickness of the resin layer is 5 µm or more, the resin film or a cured product of the resin film may have sufficient strength due to the sufficient thickness, and when the thickness of the resin layer is 500 µm or less, the resin layer may be sufficiently dried to prevent the residual solvent amount in the resin film from being increased, and thus a cured product of the resin film is prevented from foaming on heating.

The resin film for forming an optical waveguide thus obtained may be conveniently stored, for example, by winding in a roll form. The film in a roll form may be cut out to a sheet with a suitable size, which may be stored.

Application examples of the resin film for forming an optical waveguide of the present invention will be described below.

The supporting film used in a production process of a resin film for forming a core part, containing the resin film for forming an optical waveguide of the present invention is not particularly limited as far as the supporting film transmits active light for exposure used for forming a core pattern, and preferred examples thereof include those that are similar to the specific examples described for the supporting film of the resin film for forming an optical waveguide.

Among these, polyester and polyolefin are preferred from the standpoint of the transmittance of active light for exposure, the flexibility and the toughness. A supporting film with high transparency is more preferably used from the standpoint of enhancement of the transmittance of active light for exposure and reduction of roughening on the side wall of the core pattern. Examples of the commercially available products of the supporting film with high transparency include "Cosmoshine A1517" and "Cosmoshine A4100", produced by Toyobo Co., Ltd., and "Lumirror FB50", produced by Toray Industries, Inc.

The thickness of the supporting film of the resin film for forming a core part is preferably from 5 to 50 µm. When the thickness of the supporting film is 5 µm or more, the support may have sufficient strength, and when the thickness of the supporting film is 50 µm or less, the gap between a photomask and the resin layer for forming a core part on forming a core pattern may not be large, thereby providing a favorable pattern resolution. In view of the factors, the thickness of the supporting film is more preferably from 10 to 40 µm, and particularly preferably from 15 to 30 µm.

The supporting film used in a production process of a resin film for forming a cladding layer (e.g., a resin film for forming an upper cladding layer and a resin film for forming a lower cladding layer), containing the resin film for forming an optical waveguide of the present invention is not particularly limited as far as the supporting film transmits active light for exposure used for forming a cladding, and preferred examples thereof include those that are similar to the specific examples described for the supporting film of the resin film for forming an optical waveguide.

Among these, polyester and polyolefin are preferred from the standpoint of the transmittance of active light for exposure, the flexibility and the toughness. A supporting film with high transparency is more preferably used from the standpoint of enhancement of the transmittance of active light for exposure and reduction of roughening on the side wall of the cladding pattern. Examples of the commercially available products of the supporting film with high transparency include "Cosmoshine A1517" and "Cosmoshine A4100", produced by Toyobo Co., Ltd., and "Lumirror FB50", produced by Toray Industries, Inc.

The thickness of the supporting film of the resin film for forming a cladding layer is preferably from 5 to 50 µm. When the thickness of the supporting film is 5 µm or more, the support may have sufficient strength, and when the thickness of the supporting film is 50 µm or less, the gap between a photomask and the resin layer for forming a cladding layer on forming a cladding pattern may not be large, thereby providing a favorable pattern resolution. In view of the factors, the thickness of the supporting film is more preferably from 10 to 40 µm, and particularly preferably from 15 to 30 µm.

Optical Waveguide

The optical waveguide of the present invention will be described below.

FIG. 1(a) shows a cross sectional view of an optical waveguide. The optical waveguide 1 is constituted by a core part 2 that is formed on a substrate 5 and is formed of a resin composition for forming a core part having a high refractive index, and a lower cladding layer 4 and an upper cladding layer 3 that are formed of a resin composition for forming a cladding layer having a low refractive index.

The resin composition for forming an optical waveguide and the resin film for forming an optical waveguide of the present invention are preferably used in at least one of the lower cladding layer 4, the core part 2 and the upper cladding layer 3 of the optical waveguide 1.

The use of the resin film for forming an optical waveguide further enhances the flatness of the layers, the interlayer adhesion between the cladding and the core, and the resolution on forming the core pattern of the optical waveguide (i.e., the applicability to thin lines or narrow lines), thereby enabling the formation of a fine pattern that is excellent in flatness and has a narrow line width and a narrow line distance.

The material for the substrate 5 in the optical waveguide 1 is not particularly limited, and examples thereof include a glass epoxy resin substrate, a ceramic substrate, a glass substrate, a silicon substrate, a plastic substrate, a metal substrate, a substrate having a resin layer, a substrate having a metal layer, a plastic film, a plastic film having a resin layer, and a plastic film having a metal layer.

The optical waveguide 1 may be a flexible optical waveguide by using a substrate having flexibility and toughness, for example, the aforementioned supporting film of the resin film for forming an optical waveguide, as the substrate, and in this case, the substrate 5 may function as a protective film of the optical waveguide 1. The use of the protective film disposed may impart flexibility and toughness of the protective film to the optical waveguide 1. Furthermore, the handleability may also be enhanced since the optical waveguide 1 is prevented from being contaminated or damaged.

In view of the factors, the substrate 5 may be disposed as a protective film outside the upper cladding layer 3 as shown in FIG. 1(b), and the substrates 5 may be disposed as protective films outside both the lower cladding layer 4 and the upper cladding layer 3 as shown in FIG. 1(c).

In the case where the optical waveguide 1 has sufficient flexibility and toughness, the protective film 5 may not be disposed as shown in FIG. 1(d).

The thickness of the lower cladding layer 4 is not particularly limited and is preferably from 2 to 200 µm. When the thickness is 2 µm or more, the confinement of the propagating light inside the core may be facilitated, and when the thickness is 200 µm or less, the total thickness of the optical waveguide 1 may not be too large. The thickness of the lower cladding layer 4 means a value of from the boundary between the core part 2 and the lower cladding layer 4 to the lower surface of the lower cladding layer 4.

The thickness of the resin film for forming a lower cladding layer is not particularly limited and may be controlled in such a manner that the thickness of the lower cladding layer 4 after curing is in the aforementioned range.

The height of the core part 2 is not particularly limited and is preferably from 10 to 150 µm. When the height of the core part is 10 µm or more, the positioning tolerance on coupling with a light emitting/receiving device or an optical fiber after forming the optical waveguide may not be decreased, and when the height is 150 µm or less, the coupling efficiency on coupling with a light emitting/receiving device or an optical fiber after forming the optical waveguide may not be decreased. In view of the factors, the height of the core part is more preferably from 15 to 130 µm, and particularly preferably from 20 to 120 µm. The thickness of the resin film for forming a core part is not particularly limited and may be controlled in such a manner that the height of the core part after curing is in the aforementioned range.

The thickness of the upper cladding layer 3 is not particularly limited as far as it is in such a range that enables embedding of the core part 2, and is preferably from 12 to 500 µm in terms of thickness after drying. The thickness of the upper cladding layer 3 may be the same as or different from the thickness of the lower cladding layer 4 formed initially, and from the standpoint of embedding the core part 2, is preferably larger than the thickness of the lower cladding layer 4. The thickness of the upper cladding layer 3 means a value of from the boundary between the core part 2 and the lower cladding layer 4 to the upper surface of the upper cladding layer 3.

The optical waveguide of the present invention preferably has an optical transmission loss of 0.3 dB/cm or less with a light source having a wavelength of 850 nm. When the optical transmission loss is 0.3 dB/cm or less, the loss of light is small, thereby providing transmitted signal with sufficient intensity. In view of the factors, the optical transmission loss is more preferably 0.2 dB/cm or less, and particularly preferably 0.1 dB/cm or less.

The optical waveguide of the present invention preferably has an optical transmission loss of 0.3 dB/cm or less with a light source having a wavelength of 850 nm after performing a high temperature and high humidity shelf test at a temperature of 85° C. and a humidity of 85% for 1,000 hours. When the optical transmission loss is 0.3 dB/cm or less, the loss of light is small, thereby providing transmitted signal with sufficient intensity. In view of the factors, the optical transmission loss is more preferably 0.2 dB/cm or less, and particularly preferably 0.1 dB/cm or less.

The high temperature and high humidity shelf test at a temperature of 85° C. and a humidity of 85% means a high temperature and high humidity shelf test performed under conditions according to the JPCA Standard (JPCA-PE02-05-01S).

The optical waveguide of the present invention preferably has an optical transmission loss of 0.3 dB/cm or less with a light source having a wavelength of 850 nm after performing a temperature cycle test between temperatures of −55° C. and 125° C. in 1,000 cycles. When the optical transmission loss is 0.3 dB/cm or less, the loss of light is small, thereby providing transmitted signal with sufficient intensity. In view of the factors, the optical transmission loss is more preferably 0.2 dB/cm or less, and particularly preferably 0.1 dB/cm or less.

The temperature cycle test between temperatures of −55° C. and 125° C. is a temperature cycle test performed under conditions according to the JPCA Standard (JPCA-PE02-05-01S).

The optical waveguide of the present invention preferably has an optical transmission loss of 0.3 dB/cm or less with a light source having a wavelength of 850 nm after performing a reflow test with a maximum temperature of 256° C. three times. When the optical transmission loss is 0.3 dB/cm or less, the loss of light is small, thereby providing transmitted signal with sufficient intensity, and simultaneously the component mounting may be performed by a reflow process, thereby enhancing the applicable scope thereof. In view of the factors, the optical transmission loss is more preferably 0.2 dB/cm or less, and particularly preferably 0.1 dB/cm or less.

The reflow test with a maximum temperature of 256° C. is a lead-free solder reflow test performed under conditions according to the JEDEC Standard (JEDEC JESD22A113E).

The optical waveguide of the present invention is excellent in transparency, environmental reliability and heat resistance, and may be used as a light transmission path of an optical module. Examples of the configuration of the optical module include an optical waveguide with optical fibers having optical fibers connected to both ends of an optical waveguide, an optical waveguide with connectors having connectors connected to both ends of an optical waveguide, a photoelectric composite substrate having an optical waveguide and a printed circuit board formed into a complex, a photoelectric conversion module having an optical waveguide and a photoelectric conversion device converting light signal and electric signal mutually combined with each other, and a wavelength multiplexer/separator having an optical waveguide and a wavelength division filter combined with each other.

The printed circuit board, which is formed into a complex in the photoelectric composite substrate, is not particularly limited, and examples thereof include a rigid substrate, such as a glass epoxy substrate and a ceramic substrate, and a flexible substrate, such as a polyimide substrate and a polyethylene terephthalate substrate.

Production Method of Optical Waveguide

A production method for forming the optical waveguide 1 by using the resin composition for forming an optical waveguide and/or the resin film for forming an optical waveguide of the present invention will be described below.

The method for producing the optical waveguide 1 of the present invention is not particularly limited, and examples thereof include a production method of forming a resin layer for forming an optical waveguide on a substrate by using the resin composition for forming an optical waveguide and/or the resin film for forming an optical waveguide.

The substrate used in the present invention is not particularly limited, and examples thereof include those that are similar to the specific examples of the substrate 5 in the optical waveguide 1.

The method for forming the resin layer for forming an optical waveguide is not particularly limited, and examples thereof include a method of coating the resin composition for forming an optical waveguide by a spin coating method, a dip coating method, a spray coating method, a bar coating method, a roll coating method, a curtain coating method, a gravure coating method, a screen coating method, an ink-jet coating method or the like.

In the case where the resin composition for forming an optical waveguide is in the form of the resin varnish for forming an optical waveguide by diluting with the organic solvent, a drying step may be employed depending on necessity after forming the resin layer. The drying method is not particularly limited, and examples thereof include drying by heating and drying under reduced pressure, which may be used in combination depending on necessity.

Examples of the method for forming the resin layer for forming an optical waveguide also include a method using a lamination method by using the resin film for forming an optical waveguide using the resin composition for forming an optical waveguide.

Among these, a production method by a lamination method by using the resin film for forming an optical waveguide is preferred since such an optical waveguide may be produced that has a fine pattern excellent in flatness having small line width and line distance.

The production method of forming the optical waveguide 1 by using the resin films for forming an optical waveguide as the lower cladding layer, the core part and the upper cladding layer will be described below, but the present invention is not limited thereto.

As a first step, a resin film for forming a lower cladding layer is laminated on a substrate 5. The lamination method in the first step is not particularly limited, and examples thereof include a lamination method of adhering by pressing under heating by using a roll laminator or a flat laminator. The flat laminator in the present invention means a laminator, in which lamination materials are held between a pair of flat plates and adhered under pressure by applying pressure to the flat plates, and preferred examples thereof include a vacuum pressure laminator. The lamination temperature is not particularly limited and is preferably from 20 to 130° C., and the lamination pressure is not particularly limited and is preferably from 0.1 to 1.0 MPa. In the case where the resin film for forming the lower cladding layer has a protective film, the resin film may be laminated after removing the protective film.

In the case where the lamination is performed with a vacuum pressure laminator, the resin film for forming the lower cladding layer may be temporarily attached onto the substrate 5 in advance with a roll laminator. In this case, the resin film is preferably temporarily attached under pressure from the standpoint of enhancement of the adhesiveness and the followability, and may be temporarily attached thereto under heating by using a laminator having a heat roll. The lamination temperature is preferably from 20 to 150° C. When the lamination temperature is 20° C. or more, the adhesiveness between the resin film for forming the lower cladding layer and the substrate 5 may be enhanced, and when the lamination temperature is 150° C. or less, the resin layer may be prevented from being fluidized excessively on roll lamination, and thereby a target thickness may be obtained. In view of the factors, the lamination temperature is more preferably from 40 to 130° C. The lamination pressure is not particularly limited and is preferably from 0.2 to 0.9 MPa, and the lamination speed is not particularly limited and is preferably from 0.1 to 3 m/min.

The resin layer for forming the lower cladding layer thus laminated on the substrate 5 is cured with light and/or heat to form the lower cladding layer 4. The supporting film of the resin film for forming the lower cladding layer may be removed before curing or after curing.

The radiation dose of the active light on curing the resin layer for forming the lower cladding layer with light is not particularly limited and is preferably from 0.1 to 5 J/cm$^2$. In the case where the substrate transmits the active light, a double sided exposing device capable of radiating the active light from both sides of the resin film simultaneously may be used for curing efficiently. The resin layer may be irradiated with the active light under heating. The resin layer may be subjected to a heat treatment at from 50 to 200° C. depending on necessity before or after the curing with light.

The heating temperature on curing the resin layer for forming the lower cladding layer by heating is not particularly limited and is preferably from 50 to 200° C.

In the case where the supporting film of the resin film for forming the lower cladding layer is used as the protective film 5 of the optical waveguide 1, the resin film for forming the lower cladding layer may be cured with light and/or heat under the aforementioned conditions without lamination, thereby forming the lower cladding layer 4.

The protective film of the resin film for forming the lower cladding layer may be removed before curing or after curing.

As a second step, a resin film for forming a core part is laminated on the lower cladding layer 4 in the similar manner as in the first step. The resin layer for forming the core part is designed to have a higher refractive index than the resin layer for forming the lower cladding layer, and is preferably formed of a photosensitive resin composition capable of forming the core part 2 (core pattern) with active light.

As a third step, the core part 2 is exposed. The exposing method of the core part 2 is not particularly limited, and examples thereof include a method of radiating active light imagewise through a negative photomask, which is referred to as an art work, and a method of radiating active light on the image directly by using a laser direct drawing method without the use of a negative photomask.

The light source of the active light is not particularly limited, and examples thereof include a light source that effectively radiates an ultraviolet ray, such as a super-high pressure mercury lamp, a high pressure mercury lamp, a mercury vapor arc lamp, a metal halide lamp, a xenon lamp and a carbon arc lamp, and a light source that effectively radiates visible light, such as a photographic flood lamp and a sun lamp.

The radiation dose of the active light for exposing the core part 2 is preferably from 0.01 to 10 $J/cm^2$. When the radiation dose is 0.01 $J/cm^2$ or more, the curing reaction proceeds sufficiently, thereby preventing the core part 2 from being washed out on developing. When the radiation dose is 10 $J/cm^2$ or less, the core part 2 is prevented from being thickened due to an excessive exposure amount, thereby forming a fine pattern. In view of the factors, the radiation dose of the active light is more preferably from 0.03 to 5 $J/cm^2$, and particularly preferably from 0.05 to 3 $J/cm^2$.

The core part 2 may be exposed through the supporting film of the resin film for forming the core part or may be exposed after removing the supporting film.

After the exposure, the core part 2 may be subjected to post-exposure heating depending on necessity from the standpoint of enhancement of the resolution and the adhesiveness thereof. The period of time from the ultraviolet ray irradiation to the post-exposure heating is preferably 10 minutes or less, but the conditions are not particularly limited. The heating temperature of the post-exposure heating is preferably from 40 to 160° C., and the time thereof is preferably from 30 seconds to 10 minutes, but the conditions are not particularly limited.

In the case where the core part is exposed through the supporting film of the resin film for forming the core part, the supporting film is removed, and then as a fourth step, the resin layer for forming the core part is developed by using a developer solution.

The developing method is not particularly limited, and examples thereof include a spraying method, a dipping method, a paddling method, a spinning method, a brushing method and a scrubbing method. These developing methods may be used in combination depending on necessity.

The developer solution is not particularly limited, and examples thereof include an organic solvent, a quasi-aqueous developer solution containing an organic solvent and water, an aqueous alkali developer solution containing an alkali aqueous solution, and a quasi-aqueous alkali developer solution containing an alkaline aqueous solution and an organic solvent.

The developing temperature may be controlled corresponding to the developing property of the resin layer for forming the core part.

The organic solvent is not particularly limited, preferred examples thereof include compounds that are similar to the organic solvents used for diluting the resin composition for forming an optical waveguide.

The compounds may be used solely or as a combination of two or more kinds thereof. The organic solvent may contain a surfactant, a defoaming agent and the like.

The quasi-aqueous developer solution is not particularly limited as far as it contains at least one organic solvent and water.

The concentration of the organic solvent is preferably from 5 to 90% by mass. The quasi-aqueous developer solution may contain a small amount of a surfactant, a defoaming agent and the like.

The base of the alkaline aqueous solution is not particularly limited, and examples thereof include an alkali metal hydroxide, such as lithium hydroxide, sodium hydroxide and potassium hydroxide; an alkali metal carbonate salt, such as lithium carbonate, sodium carbonate and potassium carbonate; an alkali metal hydrogen carbonate salt, such as lithium hydrogen carbonate, sodium hydrogen carbonate and potassium hydrogen carbonate; an alkali metal phosphate salt, such as potassium phosphate and sodium phosphate; an alkali metal pyrophosphate salt, such as sodium pyrophosphate and potassium pyrophosphate; a sodium salt, such as sodium tetraborate and sodium metasilicate; an ammonium salt, such as ammonium carbonate and ammonium hydrogen carbonate; and an organic base, such as tetramethylammonium hydroxide, triethanolamine, ethylenediamine, diethylenetriamine, 2-amino-2-hydroxymethyl-1,3-propanediol and 1,3-diaminopropanol-2-morpholine.

These compounds may be used solely or as a combination of two or more kinds thereof.

The pH of the aqueous alkali developer solution is preferably from 9 to 14. The aqueous alkali developer solution may contain a surfactant, a defoaming agent and the like.

The quasi-aqueous alkali developer solution is not particularly limited as far as it contains an alkaline aqueous solution and at least one organic solvent. The organic solvent is not particularly limited, and preferred examples thereof include compounds that are similar to the organic solvents used for diluting the resin composition for forming an optical waveguide.

The pH of the quasi-aqueous alkali developer solution is preferably as small as possible within such a range that the development is sufficiently performed, and is preferably from 8 to 13, and more preferably from 9 to 12.

The concentration of the organic solvent is generally preferably from 5 to 90% by mass. The quasi-aqueous alkali developer solution may contain a small amount of a surfactant, a defoaming agent and the like.

As a process after the development, the core part may be rinsed with the organic solvent, the quasi-aqueous rinsing solution, or water.

The rinsing method is not particularly limited, and examples thereof include a spraying method, a dipping method, a paddling method, a spinning method, a brushing method and a scrubbing method. These rinsing methods may be used in combination depending on necessity.

The organic solvent may be used solely or as a combination of two or more kinds thereof. In the quasi-aqueous rinsing solution, the concentration of the organic solvent is preferably from 5 to 90% by mass. The rinsing temperature may be controlled corresponding to the developing property of the resin layer for forming the core part.

As a process after the development or the rinsing, the core part 2 may be exposed and/or heated depending on necessity from the standpoint of enhancement of the curing property and the adhesiveness of the core part 2. The heating temperature is not particularly limited and is preferably from 40 to 200° C., and the radiation dose of the active light is not particularly limited and is preferably from 0.01 to 10 $J/cm^2$.

As a fifth step, a resin film for forming an upper cladding layer is laminated on the lower cladding layer 4 and the core part 2 in the similar manner as in the first and second steps. The resin layer for forming the upper cladding layer is designed to have a lower refractive index than the resin layer for forming the core part. The thickness of the resin layer for forming the upper cladding layer is preferably larger than the height of the core part 2.

Subsequently, the resin layer for forming the upper cladding layer is cured with light and/or heat in the similar manner as in the step 1 to form the upper cladding layer 3.

The radiation dose of the active light on curing the resin layer for forming the upper cladding layer with light is not particularly limited and is preferably from 0.1 to 30 J/cm$^2$. In the case where the substrate transmits the active light, a double sided exposing device capable of radiating the active light from both sides of the resin film simultaneously may be used. The resin layer may be irradiated with the active light under heating depending on necessity, and may be subjected to a heat treatment as a treatment before or after curing with light. The heating temperature during irradiation with active light and/or after irradiation with active light is not particularly limited and is preferably from 50 to 200° C.

The heating temperature on curing the resin layer for forming the upper cladding layer by heating is not particularly limited and is preferably from 50 to 200° C.

In the case where the supporting film of the resin film for forming the upper cladding layer is necessarily removed, the supporting film may be removed before curing or after curing.

The optical waveguide 1 is thus produced according to the aforementioned process steps.

EXAMPLE

The present invention will be described more specifically with reference to examples below, but the invention is not limited to the examples in any way.

Synthesis Example 1

Production of (meth)acrylic Polymer A-1

46 parts by mass of propylene glycol monomethyl ether acetate and 23 parts by mass of methyl lactate were weighed and placed in a flask equipped with an agitator, a condenser, a gas introduction tube, a dropping funnel and a thermometer, and stirred with nitrogen gas introduced therein. After the liquid temperature was increased to 65° C., a mixture of 16 parts by mass of N-cyclohexylmaleimide, 65 parts by mass of benzyl methacrylate, 29 parts by mass of 2-hydroxyethyl methacrylate, 2 parts by mass of 2,2'-azobis(2,4-dimethylvaleronitrile), 46 parts by mass of propylene glycol monomethyl ether acetate and 23 parts by mass of methyl lactate was added dropwise thereto over 3 hours, and the mixture was stirred at 65° C. for 3 hours and further continuously stirred at 95° C. for 1 hour, thereby providing a (meth)acrylic polymer A-1 solution (solid content: 45% by mass).

Measurement of Weight Average Molecular Weight

The weight average molecular weight (standard polystyrene conversion) of A-1 measured with GPC (SD-8022, DP-8020 and RI-8020, produced by Tosoh Corporation) was 3.8×10$^4$. The columns used were Gelpack GL-A150-S and Gelpack GL-A160-S, produced by Hitachi Chemical Co., Ltd.

Synthesis Example 2

Production of (meth)acrylic Polymer A-2

46 parts by mass of propylene glycol monomethyl ether acetate and 23 parts by mass of methyl lactate were weighed and placed in a flask equipped with an agitator, a condenser, a gas introduction tube, a dropping funnel and a thermometer, and stirred with nitrogen gas introduced therein. After the liquid temperature was increased to 65° C., a mixture of 47 parts by mass of methyl methacrylate, 33 parts by mass of butyl acrylate, 16 parts by mass of 2-hydroxyethyl methacrylate, 14 parts by mass of methacrylic acid, 3 parts by mass of 2,2'-azobis(2,4-dimethylvaleronitrile), 46 parts by mass of propylene glycol monomethyl ether acetate and 23 parts by mass of methyl lactate was added dropwise thereto over 3 hours, and the mixture was stirred at 65° C. for 3 hours and further continuously stirred at 95° C. for 1 hour, thereby providing a (meth)acrylic polymer A-2 solution (solid content: 45% by mass).

The weight average molecular weight of A-2 measured in the same manner as in Synthesis Example 1 was 3.9×10$^4$.

Measurement of Acid Value

The acid value of A-2 measured was 79 mgKOH/g. The acid value was calculated from the amount of a 0.1 mol/L potassium hydroxide aqueous solution that was required for neutralizing the A-2 solution. The point where phenolphthalein added as an indicator was changed from colorless to pink color was designated as the neutralization point.

Synthesis Example 3

Production of (meth)acrylic Polymer A-3

46 parts by mass of propylene glycol monomethyl ether acetate and 23 parts by mass of methyl lactate were weighed and placed in a flask equipped with an agitator, a condenser, a gas introduction tube, a dropping funnel and a thermometer, and stirred with nitrogen gas introduced therein. After the liquid temperature was increased to 65° C., a mixture of 16 parts by mass of N-cyclohexylmaleimide, 55 parts by mass of benzyl methacrylate, 19 parts by mass of methyl methacrylate, 21 parts by mass of methacrylic acid, 2 parts by mass of 2,2'-azobis(2,4-dimethylvaleronitrile), 46 parts by mass of propylene glycol monomethyl ether acetate and 23 parts by mass of methyl lactate was added dropwise thereto over 3 hours, and the mixture was stirred at 65° C. for 3 hours and further continuously stirred at 95° C. for 1 hour, thereby providing a (meth)acrylic polymer A-3 solution (solid content: 45% by mass).

The weight average molecular weight and the acid value of A-3 measured in the same manners as in Synthesis Examples 1 and 2 were 3.5×10$^4$ and 120 mgKOH/g, respectively.

Example 1

Preparation of Resin Varnish for forming Core Part COV-1

89 parts by mass (solid content: 40 parts by mass) of the A-1 solution (solid content: 45% by mass) as the component (A); 25 parts by mass of a urethane (meth)acrylate having a polyester skeleton (U-108A, produced by Shin-Nakamura Chemical Co., Ltd.) as the component (B); 20 parts by mass of ethoxylated bisphenol A diacrylate (Fancryl FA-321A, produced by Hitachi Chemical Co., Ltd.) as the component (E); 20 parts by mass (solid content: 15 parts by mass) of a polyfunctional blocked isocyanate solution formed by protecting an isocyanurate type trimer of hexamethylene diisocyanate with methyl ethyl ketone oxime (solid content: 75% by mass) (Sumidur BL3175, produced by Sumika Bayer Urethane Co., Ltd.) as the component (C); 1 part by mass of 1-[4-(2-hydroxyethoxy)phenyl]-2-hydroxy-2-methyl-1-propan-1-one (Irgacure 2959, produced by BASF Japan Co., Ltd.) and 1 part by mass of bis(2,4,6-trimethylbenzoyl) phenylphosphine oxide (Irgacure 819, produced by BASF Japan Co., Ltd.) as the component (D); and 19 parts by mass of propylene glycol monomethyl ether acetate as an organic solvent for dilution were mixed by agitation. The mixture was filtered under pressure with a Polyflon filter with a pore diameter of 2 μm (PF020, a trade name, produced by Advantec Toyo Co., Ltd.), and then defoamed under reduced pressure, thereby providing a resin varnish for forming a core part COV-1.

Production of Resin Film for forming Core Part COF-1

The resin varnish for forming a core part COV-1 was coated on a non-treated surface of a PET film (Cosmoshine A1517, produced by Toyobo Co., Ltd., thickness: 16 μm) with a coating machine (Multicoater TM-MC, produced by Hirano Tecseed Co., Ltd.) and dried at 80° C. for 10 minutes and at 100° C. for 10 minutes, and then a PET film with a surface having been subjected to a releasing treatment (Purex A31, produced by Teijin DuPont Films Japan Ltd., thickness: 25 μm) as a protective film was then attached thereto, thereby providing a resin film for forming a core part COF-1. The thickness of the resin layer may be arbitrarily controlled by changing the gap of the coating machine. In the example, the coating machine was controlled to provide a thickness after curing of 50 μm for the resin film for forming a core part.

Evaluation of Toughness

The resin film for forming a core part COF-1 was irradiated with an ultraviolet ray (wavelength: 365 nm) to 2,000 mJ/cm² with an ultraviolet ray exposing machine (MAP-1200-L, produced by Dainippon Screen Mfg. Co., Ltd.). The supporting film (A1517) and the protective film (A31) were removed, and the resin film was cured at 160° C. for 1 hour, thereby providing a cured film having a thickness of 50 μm.

The resulting cured film was cut into a width of 10 mm and a length of 70 mm and subjected to a tensile test (chuck distance: 50 mm) with a tensile tester (RTM-100, produced by Orientec Co., Ltd.) at a temperature of 25° C. and a tensile speed of 5 mm/min according to JIS K7127. The toughness was evaluated by the following standard.

The results are shown in Table 1.

AA: tensile breaking elongation of 20% or more
A: tensile breaking elongation of 10% or more and less than 20%
B: tensile breaking elongation of 5% or more and less than 10%
C: tensile breaking elongation of less than 5%

The tensile breaking elongation was calculated according to the following expression.

tensile breaking elongation (%)=((chuck distance on breaking (mm))−(initial chuck distance (mm)))/ ((initial chuck distance (mm))×100

Example 2

Preparation of Resin Varnish for Forming Cladding Layer CLV-1

84 parts by mass (solid content: 38 parts by mass) of the A-2 solution (solid content: 45% by mass) as the component (A); 33 parts by mass of a urethane (meth)acrylate having a polyester skeleton (U-200AX, produced by Shin-Nakamura Chemical Co., Ltd.) and 15 parts by mass of a urethane (meth)acrylate having a polypropylene glycol skeleton (UA-4200, produced by Shin-Nakamura Chemical Co., Ltd.) as the component (B); 20 parts by mass (solid content: 15 parts by mass) of a polyfunctional blocked isocyanate solution formed by protecting an isocyanurate type trimer of hexamethylene diisocyanate with methyl ethyl ketone oxime (solid content: 75% by mass) (Sumidur BL3175, produced by Sumika Bayer Urethane Co., Ltd.) as the component (C); 1 part by mass of 1-[4-(2-hydroxyethoxy)phenyl]-2-hydroxy-2-methyl-1-propan-1-one (Irgacure 2959, produced by BASF Japan Co., Ltd.) and 1 part by mass of bis(2,4,6-trimethylbenzoyl)phenylphosphine oxide (Irgacure 819, produced by BASF Japan Co., Ltd.) as the component (D); and 23 parts by mass of propylene glycol monomethyl ether acetate as an organic solvent for dilution were mixed by agitation. The mixture was filtered under pressure with a Polyflon filter with a pore diameter of 2 μm (PF020, a trade name, produced by Advantec Toyo Co., Ltd.), and then defoamed under reduced pressure, thereby providing a resin varnish for forming a cladding layer CLV-1.

Production of Resin Film for Forming Cladding Layer CLF-1

The resin composition for forming a cladding layer CLV-1 was coated on a non-treated surface of a PET film (Cosmoshine A4100, produced by Toyobo Co., Ltd., thickness: 50 μm) with the aforementioned coating machine and dried at 100° C. for 20 minutes, and then a PET film with a surface having been subjected to a releasing treatment (Purex A31, produced by Teijin DuPont Films Japan Ltd., thickness: 25 μm) as a protective film was then attached thereto, thereby providing a resin film for forming a cladding layer CLF-1. The thickness of the resin layer may be arbitrarily controlled by changing the gap of the coating machine. In the example, the coating machine was controlled to provide a thickness after curing of 20 μm for the resin film for forming a lower cladding layer and 60 μm for the resin film for forming an upper cladding layer.

The resin film for forming an upper cladding layer CLF-1 was evaluated for toughness of the cured film in the same manners in Example 1. The results are shown in Table 1.

Examples 3 to 6 and Comparative Examples 1 to 4

Resin varnishes for forming a core part COV-2 to 6 and resin varnishes for forming a cladding layer CLV-2 to 4 were prepared according to the mixing ratios shown in Table 1, and resin films for forming a core part COF-2 to 6 and resin films for forming a cladding layer CLF-2 to 4 were produced in the same manner as in Example 1.

The resin films for forming a core part COF-2 to 6 and the resin film for forming a cladding layer CLF-2 to 4 were evaluated for toughness of the cured film in the same manners in Example 1. The results are shown in Table 1.

TABLE 1

| Items | Mixed components (part by mass) | Example 1 COV-1 (COF-1) | Example 2 CLV-1 (CLF-1) | Example 3 COV-2 (COF-2) | Example 4 COV-3 (COF-3) | Example 5 COV-4 (COF-4) | Example 6 CLV-2 (CLF-2) |
|---|---|---|---|---|---|---|---|
| Component (A) | A-1 solution*1 | 89 (solid content: 40) | — | 89 (solid content: 40) | — | — | — |
| | A-2 solution*2 | — | 84 (solid content: 38) | — | — | — | 89 (solid content: 40) |
| | A-3 solution*3 | — | — | — | 78 (solid content: 35) | 78 (solid content: 35) | — |
| Component (B) | U-108A*4 | 25 | — | 30 | — | — | 30 |
| | U-200AX*5 | — | 33 | — | — | — | — |
| | UA-4200*6 | — | 15 | — | 20 | — | — |
| | UA-6200*7 | — | — | — | 28 | 28 | — |
| Component (E) | FA-321A*8 | 20 | — | 20 | — | 20 | — |
| | FA-P240A*9 | — | — | — | — | — | 15 |
| | EA-1020*10 | — | — | — | — | — | — |
| | DPE-6A*11 | — | — | — | — | — | — |
| Component (C) | BL3175*12 | 20 (solid content: 15) | 20 (solid content: 15) | — | 23 (solid content: 18) | 23 (solid content: 18) | 20 (solid content: 15) |
| | BL4265*13 | — | — | 20 (solid content: 15) | — | — | — |
| Component (D) | 819*14 | 1 | 1 | 1 | 1 | 1 | 1 |
| | 2959*15 | 1 | 1 | 1 | 1 | 1 | 1 |
| Organic solvent | PGMEA*16 | 19 | 23 | 19 | 25 | 25 | 19 |
| Evaluation | Toughness*17 | A | AA | AA | AA | A | AA |

| Items | Mixed components (part by mass) | Comparative Example 1 COV-5 (COF-5) | Comparative Example 2 CLV-3 (CLF-3) | Comparative Example 3 COV-6 (COF-6) | Comparative Example 4 CLV-4 (CLF-4) |
|---|---|---|---|---|---|
| Component (A) | A-1 solution*1 | — | — | — | — |
| | A-2 solution*2 | — | 133 (solid content: 60) | — | 89 (solid content: 40) |
| | A-3 solution*3 | 133 (solid content: 60) | — | 89 (solid content: 40) | — |
| Component (B) | U-108A*4 | — | — | — | 40 |
| | U-200AX*5 | — | — | — | — |
| | UA-4200*6 | — | — | 20 | — |
| | UA-6200*7 | — | — | 40 | — |
| Component (E) | FA-321A*8 | 15 | — | — | — |
| | FA-P240A*9 | — | 10 | — | 20 |
| | EA-1020*10 | 15 | — | — | — |
| | DPE-6A*11 | — | 20 | — | — |
| Component (C) | BL3175*12 | 13 (solid content: 10) | 13 (solid content: 10) | — | — |
| | BL4265*13 | — | — | — | — |
| Component (D) | 819*14 | 1 | 1 | 1 | 1 |
| | 2959*15 | 1 | 1 | 1 | 1 |
| Organic solvent | PGMEA*16 | 10 | 10 | 19 | 19 |
| Evaluation | Toughness*17 | C | C | AA | AA |

*1 Propylene glycol monomethyl ether acetate/methyl lactate solution of (meth)acrylic polymer A-1 produced in Synthesis Example 1 (solid content: 45% by mass)
*2 Propylene glycol monomethyl ether acetate/methyl lactate solution of (meth)acrylic polymer A-2 produced in Synthesis Example 2 (solid content: 45% by mass)
*3 Propylene glycol monomethyl ether acetate/methyl lactate solution of (meth)acrylic polymer A-3 produced in Synthesis Example 3 (solid content: 45% by mass)
*4 Urethane (meth)acrylate having polyester skeleton (NK Oligo U-108A, produced by Shin-Nakamura Chemical Co., Ltd.)
*5 Urethane (meth)acrylate having polyester skeleton (U-200AX, produced by Shin-Nakamura Chemical Co., Ltd.)
*6 Urethane (meth)acrylate having polypropylene glycol skeleton (UA-4200, produced by Shin-Nakamura Chemical Co., Ltd.)
*7 Urethane (meth)acrylate having carboxyl group and polyether skeleton (UA-6200, produced by Shin-Nakamura Chemical Co., Ltd.)
*8 Ethoxylated bisphenol A diacrylate (Fancryl FA-321A, produced by Hitachi Chemical Co., Ltd.)
*9 Polypropylene glycol diacrylate (Fancryl FA-P240A, produced by Hitachi Chemical Co., Ltd.)
*10 Bisphenol A type epoxy diacrylate (NK Oligo EA-1020, produced by Shin-Nakamura Chemical Co., Ltd.)
*11 Dipentaerythritol hexaacrylate (Light Acrylate DPE-6A, produced by Kyoeisha Chemical Co., Ltd.)
*12 Polyfunctional blocked isocyanate solution formed by protecting isocyanurate type trimer of hexamethylene diisocyanate with methyl ethyl ketone oxime (solid content: 75% by mass) (Sumidur BL3175, produced by Sumika Bayer Urethane Co., Ltd.)
*13 Polyfunctional blocked isocyanate solution formed by protecting isocyanurate type trimer of isophorone diisocyanate with methyl ethyl ketone oxime (solid content: 65% by mass) (Desmodur BL4265, produced by Sumika Bayer Urethane Co., Ltd.)
*14 1-[4-(2-Hydroxyethoxy)phenyl]-2-hydroxy-2-methyl-1-propan-1-one (Irgacure 2959, produced by BASF Japan Co., Ltd.)
*15 Bis(2,4,6-trimethylbenzoyl)phenylphosphine oxide (Irgacure 819, produced by BASF Japan Co., Ltd.)
*16 Propylene glycol monomethyl ether acetate
*17 AA: tensile breaking elongation of 20% or more, A: tensile breaking elongation of 10% or more and less than 20%, B: tensile breaking elongation of 5% or more and less than 10%, C: tensile breaking elongation of less than 5%

Example 7

Production of Flexible Optical Waveguide

The resin film for forming a lower cladding layer CLF-1, from which the protective film (Purex A31) had been removed, was laminated on a PET film with a surface having been subjected to a releasing treatment (Purex A53, produced by Teijin DuPont Films Japan Ltd., thickness: 50 μm) with a roll laminator (HLM-1500, produced by Hitachi Chemical Technoplant Co., Ltd.) under conditions of a pressure of 0.5 MPa, a temperature of 80° C. and a speed of 0.2 m/min. The laminated product was further adhered under pressure with a vacuum pressure laminator (MVLP-500/

600, produced by Meiki Co., Ltd.) under conditions of a pressure of 0.4 MPa, a temperature of 80° C. and a pressing time of 30 seconds.

The laminated product was then irradiated with an ultraviolet ray (wavelength: 365 nm) to 2,000 mJ/cm$^2$ with an ultraviolet ray exposing machine (MAP-1200-L, produced by Dainippon Screen Mfg. Co., Ltd.), and then the supporting film (A4100) was removed. Thereafter, the film was cured by heating to 160° C. for 1 hour, thereby forming the lower cladding layer 4.

Subsequently, the resin film for forming a core part COF-1, from which the protective film (A31) had been removed, was laminated on the lower cladding layer 4 with the aforementioned roll laminator under conditions of a pressure of 0.5 MPa, a temperature of 80° C. and a speed of 0.2 m/min. The laminated product was further adhered under pressure with the aforementioned vacuum pressure laminator under conditions of a pressure of 0.4 MPa, a temperature of 80° C. and a pressing time of 30 seconds.

The laminated product was irradiated with an ultraviolet ray (wavelength: 365 nm) to 1,000 mJ/cm$^2$ through a negative photomask with a width of 50 μm with the aforementioned ultraviolet ray exposing machine, thereby exposing the core part 2 (core pattern). After subjecting the laminated product to post-exposure heating at 80° C. for 5 minutes, the supporting film (A1517) was removed, and the core part was developed with propylene glycol monomethyl ether acetate/N,N-dimethylacetamide (70/30 by mass). Subsequently, the core part was rinsed with propylene glycol monomethyl ether acetate and then rinsed with 2-propanol. The core part was then dried by heating to 80° C. for 30 minutes and 100° C. for 1 hour, and then further cured by heating to 160° C. for 1 hour.

The resin film for forming an upper cladding layer CLF-1, from which the protective film (A31) had been removed, was laminated on the core part 2 and the lower cladding layer 4 with the vacuum pressure laminator under conditions of a pressure of 0.4 MPa, a temperature of 100° C. and a pressing time of 30 seconds. The laminated product was irradiated with an ultraviolet ray (wavelength: 365 nm) to 2,000 mJ/cm$^2$, and after removing the supporting film (A4100), subjected to a heat curing at 160° C. for 1 hour, thereby forming an upper cladding layer 3. Thereafter, the PET film with a surface having been subjected to a releasing treatment (A53) was removed, thereby providing the optical waveguide 1 shown in FIG. 1(*d*). The flexible optical waveguide was then cut into a length of 10 cm with a dicing saw (DAD-522, produced by Disco Corporation).

The resulting flexible optical waveguide was subjected to the following evaluation. The results are shown in Table 4.

Measurement of Optical Transmission Loss

The resulting flexible optical waveguide was measured for optical transmission loss with a VCSEL with a light source of a wavelength of 850 nm as the center wavelength (FLS-300-01-VCL, produced by EXFO, Inc.), a light receiving sensor (Q82214, produced by Advantest Corporation), an incident fiber (GI-50/125 multimode fiber, NA=0.20) and an outgoing fiber (SI-114/125, NA=0.22). The optical transmission loss was calculated by dividing the optical transmission loss measured value (dB) by the optical waveguide length (10 cm), and evaluated by the following standard.

AA: 0.1 dB/cm or less
A: more than 0.1 dB/cm and 0.2 dB/cm or less
B: more than 0.2 dB/cm and 0.3 dB/cm or less
C: more than 0.3 dB/cm High Temperature and High Humidity Shelf Test The resulting flexible optical waveguide was subjected to a high temperature and high humidity shelf test at a temperature of 85° C. and a humidity of 85% for 1,000 hours according to the JPCA Standard (JPCA-PE02-05-01S) with a high temperature and high humidity tester (PL-2KT, produced by Espec Corporation).

The optical transmission loss of the optical waveguide after performing the high temperature and high humidity shelf test was measured with the same light source, light receiving device, incident fiber and outgoing fiber as above, and evaluated by the following standard.

AA: 0.1 dB/cm or less
A: more than 0.1 dB/cm and 0.2 dB/cm or less
B: more than 0.2 dB/cm and 0.3 dB/cm or less
C: more than 0.3 dB/cm Temperature Cycle Test The resulting flexible optical waveguide was subjected to a temperature cycle test between temperatures of −55° C. and 125° C. in 1,000 cycles under conditions according to the JPCA Standard (JPCA-PE02-05-01S) with a temperature cycle tester (ETAC WINTECH NT1010, produced by Kusumoto Chemicals, Ltd.). The detailed temperature cycle test conditions are shown in Table 2.

TABLE 2

| Item | | Temperature (° C.) | Time (min) |
|---|---|---|---|
| 1 Cycle | Step 1 | −55 | 15 |
| | Step 2 | 125 | 15 |

The optical transmission loss of the optical waveguide after performing the temperature cycle test was measured with the same light source, light receiving device, incident fiber and outgoing fiber as above, and evaluated by the following standard.

Figure 2:
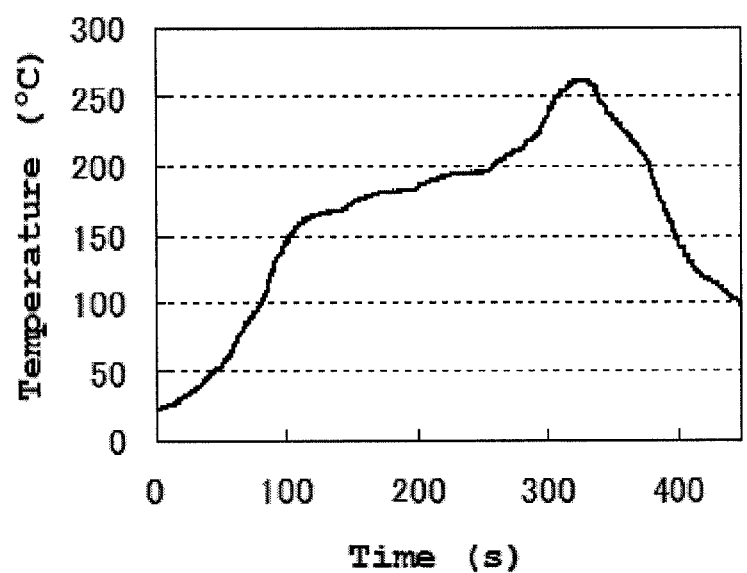
FIG. 2 is a temperature profile in a reflow furnace in a reflow test performed in the present invention.

AA: 0.1 dB/cm or less
A: more than 0.1 dB/cm and 0.2 dB/cm or less
B: more than 0.2 dB/cm and 0.3 dB/cm or less
C: more than 0.3 dB/cm Reflow Test The resulting flexible optical waveguide was subjected to a reflow test with a maximum temperature of 265° C. in a nitrogen atmosphere three times under conditions according the IPC/JEDEC J-STD-020B with a reflow tester (Salamander XNA-645PC, produced by Furukawa Electric Co., Ltd.). The detailed reflow conditions are shown in Table 3, and the temperature profile in the reflow furnace is shown in FIG. 2.

TABLE 3

|  | Zone No. | | | | | | |
| --- | --- | --- | --- | --- | --- | --- | --- |
|  | 1 | 2 | 3 | 4 | 5 | 6 | 7 |
| Upper heater temperature (° C.) | 175 | 195 | 220 | 250 | 280 | 220 | 0 |
| Lower heater temperature (° C.) | 175 | 195 | 220 | 250 | 300 | 240 | 0 |
| Conveyer speed (cm/min) | | | | 60 | | | |

The optical transmission loss of the optical waveguide after performing the reflow test was measured with the same light source, light receiving device, incident fiber and outgoing fiber as above, and evaluated by the following standard.
AA: 0.1 dB/cm or less
A: more than 0.1 dB/cm and 0.2 dB/cm or less
B: more than 0.2 dB/cm and 0.3 dB/cm or less
C: more than 0.3 dB/cm Evaluation of Toughness The flexible optical waveguide was evaluated for toughness by winding the flexible optical waveguide on a bar having a radius of 1 mm, by the following standard.
A: no change
C: cracked or broken Examples 8 to 10 and Comparative Examples 5 and 6

Flexible optical waveguides were produced by using the resin films for forming a core part COF-2 to 4 and the resin films for forming a cladding layer CLF-1 to 4 in the same manner as in Example 7.

Subsequently, the resulting flexible optical waveguides (length: 10 cm) were subjected to the measurement of optical transmission loss, the high temperature and high humidity shelf test, the temperature cycle test and the reflow test under the same conditions as in Example 7.

The results are shown in Table 4. The developing conditions in Table 4 are shown in Table 5.

TABLE 4

| Items | Example 7 | Example 8 | Example 9 | Example 10 | Comparative Example 5 | Comparative Example 6 |
| --- | --- | --- | --- | --- | --- | --- |
| Resin film for forming core part | COF-1 | COF-2 | COF-3 | COF-4 | COF-5 | COF-6 |
| Resin film for forming cladding layer | CLF-1 | CLF-1 | CLF-2 | CLF-2 | CLF-3 | CLF-4 |
| Developing condition[1] | A | A | B | B | B | B |
| Optical transmission loss[2] | A | A | A | A | A | AA |
| High temperature and high humidity shelf test[2] | A | A | B | B | A | C |
| Temperature cycle test[2] | A | A | B | B | A | B |
| Reflow test[2] | A | A | B | B | A | C |
| Evaluation of toughness[3] | A | A | A | A | C | A |

[1]see Table 5
[2]AA: 0.1 dB/cm or less, A: more than 0.1 dB/cm and 0.2 dB/cm or less, B: more than 0.2 dB/cm and 0.3 dB/cm or less, C: more than 0.3 dB/cm
[3]A: no change, C: cracked or broken

TABLE 5

| Items | Developing condition A | Developing Condition B |
| --- | --- | --- |
| Developer solution | Propylene glycol monomethyl ether acetate/N,N-dimethylacetamide (70/30 by mass) | 1% by mass sodium carbonate aqueous solution |
| Rinsing solution 1 | Propylene glycol monomethyl ether acetate | water |
| Rinsing solution 2 | 2-propanol | 0.3% by mass sulfuric acid aqueous solution |
| Rinsing solution 3 | — | water |

It is understood from Tables 1 and 4 that the resin compositions for forming an optical waveguide of the present invention are excellent in transparency, heat resistance and toughness, and the optical waveguides produced by using the same are excellent in transparency, heat resistance, environmental reliability and toughness. It is also understood that the resin compositions for forming an optical waveguide shown in Comparative Examples and 2 outside the present invention and the optical waveguide produced by using the same shown in Comparative Example 5 are excellent in transparency, heat resistance and environmental reliability, but are inferior in toughness. It is also understood that the resin compositions for forming an optical waveguide shown in Comparative Examples 3 and 4 outside the present invention and the optical waveguide produced by using the same shown in Comparative Example 6 are excellent in transparency and toughness, but are inferior in heat resistance and environmental reliability.

INDUSTRIAL APPLICABILITY

The resin composition for forming an optical waveguide of the present invention is excellent in transparency, heat resistance and toughness, and the optical waveguide produced by using the same is excellent in transparency, environmental reliability, heat resistance and toughness. The resin film for an optical material using the resin composition for forming an optical waveguide enhances, in the production process of an optical waveguide, the flatness of the layers, the interlayer adhesion between the cladding and the core, and the resolution on forming the core pattern of the optical waveguide (i.e., the applicability to thin lines or narrow lines), thereby enabling the formation of a fine pattern that is excellent in flatness and has a narrow line width and a narrow line distance.

DESCRIPTION OF THE SYMBOLS 1 optical waveguide
2 core part
3 upper cladding layer
4 lower cladding layer
5 substrate

The invention claimed is:
1. A resin composition for forming an optical waveguide, comprising (A) a polymer having a hydroxyl group and/or a carboxyl group, (B) a (meth)acrylate having a urethane bond, (C) a polyfunctional blocked isocyanate compound, and (D) a radical polymerization initiator, but not comprising (E) a (meth)acrylate having no urethane bond, wherein the component (B) contains a (meth)acrylate having a carboxyl group, a urethane bond, and a polyether skeleton, wherein the component (A) contains a (meth)acrylic polymer that has at least one of structural units represented by the following general formulae (1) and (2) and has a structural unit represented by the following general formula (3):

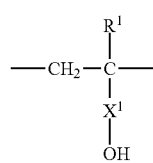

(1)

wherein $R^1$ represents a hydrogen atom or a methyl group, and $X^1$ represents a single bond or a divalent organic group having from 1 to 20 carbon atoms,

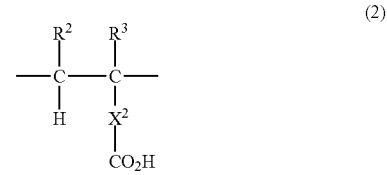

(2)

wherein $R^2$ represents a hydrogen atom or a monovalent organic group having from 1 to 20 carbon atoms, $R^3$ represents a hydrogen atom or a methyl group, and $X^2$ represents a single bond or a divalent organic group having from 1 to 20 carbon atoms,

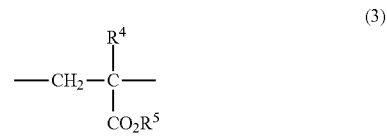

(3)

wherein $R^4$ represents a hydrogen atom or a methyl group, and $R^5$ represents a monovalent organic group having from 1 to 20 carbon atoms,
wherein the component (A) further has a structural unit represented by the general formula (4):

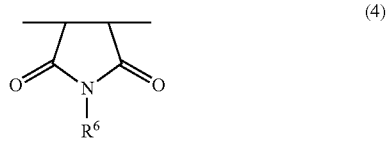

(4)

wherein $R^6$ represents a hydrogen atom or a monovalent organic group having from 1 to 20 carbon atoms, and
wherein an amount of the component (A) is from 20 to 75% by mass of the total amount of the components (A) to (C),
an amount of the component (B) is from 20 to 75% by mass of the total amount of the components (A) to (C),
an amount of the component (C) is from 5 to 30% by mass of the total amount of the components (A) to (C), and
an amount of the component (D) is from 0.01 to 10 parts by mass per 100 parts by mass of a total of the components (A) to (C).
2. The resin composition for forming an optical waveguide according to claim 1, wherein the component (B) further contains a compound having at least one selected from the group consisting of an alicyclic structure, an aromatic ring structure and a heterocyclic structure in the molecule thereof.
3. An optical waveguide comprising a core part and/or a cladding layer that contains the resin composition for forming an optical waveguide according to claim 2.
4. The resin composition for forming an optical waveguide according to claim 1, wherein the component (C) is a reaction product of a polyfunctional isocyanate compound and a blocking agent, and the polyfunctional isocyanate compound contains a compound having at least one selected from the group consisting of an alicyclic structure and an aliphatic structure in the molecule thereof.

5. The resin composition for forming an optical waveguide according to claim 1, wherein the component (D) contains a photoradical polymerization initiator.

6. An optical waveguide comprising a core part and/or a cladding layer that contains the resin composition for forming an optical waveguide according to claim 1.

7. The optical waveguide according to claim 6, which has an optical transmission loss of 0.3 dB/cm or less with a light source having a wavelength of 850 nm.

8. The resin composition for forming an optical waveguide according to claim 1, wherein an acid value of component (B) is from 5 to 200 mgKOH/g.

9. The resin composition for forming an optical waveguide according to claim 1, wherein the component (B) further contains a urethane (meth)acrylate having polypropylene glycol skeleton.

10. A resin film for forming an optical waveguide, comprising a resin composition for forming the optical waveguide, wherein the resin composition comprises (A) a polymer having a hydroxyl group and/or a carboxyl group, (B) a (meth)acrylate having a urethane bond, (C) a polyfunctional blocked isocyanate compound, and (D) a radical polymerization initiator, but not comprising (E) a (meth)acrylate having no urethane bond, wherein the component (B) contains a (meth)acrylate having a carboxyl group, a urethane bond, and a polyether skeleton, wherein the component (A) contains a (meth)acrylic polymer that has at least one of structural units represented by the following general formulae (1) and (2) and has a structural unit represented by the following general formula (3):

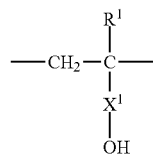

(1)

wherein $R^1$ represents a hydrogen atom or a methyl group, and $X^1$ represents a single bond or a divalent organic group having from 1 to 20 carbon atoms,

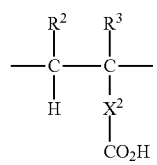

(2)

wherein $R^2$ represents a hydrogen atom or a monovalent organic group having from 1 to 20 carbon atoms, $R^3$ represents a hydrogen atom or a methyl group, and $X^2$ represents a single bond or a divalent organic group having from 1 to 20 carbon atoms,

(3)

wherein $R^4$ represents a hydrogen atom or a methyl group, and $R^5$ represents a monovalent organic group having from 1 to 20 carbon atoms, wherein the component (A) further has a structural unit represented by the general formula (4):

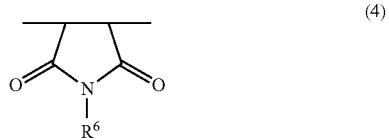

(4)

wherein $R^6$ represents a hydrogen atom or a monovalent organic group having from 1 to 20 carbon atoms, and wherein an amount of the component (A) is from 20 to 75% by mass of the total amount of the components (A) to (C), an amount of the component (B) is from 20 to 75% by mass of the total amount of the components (A) to (C), an amount of the component (C) is from 5 to 30% by mass of the total amount of the components (A) to (C), and an amount of the component (D) is from 0.01 to 10 parts by mass per 100 parts by mass of a total of the components (A) to (C).

11. The resin film for forming an optical waveguide according to claim 10, wherein the component (B) further contains a urethane (meth)acrylate having polypropylene glycol skeleton.

* * * * *